(12) United States Patent
Feng et al.

(10) Patent No.: US 12,200,375 B2
(45) Date of Patent: Jan. 14, 2025

(54) APPARATUSES, COMPUTER-IMPLEMENTED METHODS, AND COMPUTER PROGRAM PRODUCTS FOR OFF-AXIS ILLUMINATION PROJECTION AND USE

(71) Applicant: Hand Held Products, Inc., Charlotte, NC (US)

(72) Inventors: Chen Feng, Snohomish, WA (US); Tao Xian, Mount Laurel, NJ (US); Eric A. Youngblood, Matthews, NC (US)

(73) Assignee: Hand Held Products, Inc., Charlotte, NC (US)

( * ) Notice: Subject to any disclaimer, the term of this patent is extended or adjusted under 35 U.S.C. 154(b) by 2 days.

(21) Appl. No.: 17/808,241

(22) Filed: Jun. 22, 2022

(65) Prior Publication Data

US 2023/0421918 A1    Dec. 28, 2023

(51) Int. Cl.
*H04N 23/957* (2023.01)
*H04N 23/45* (2023.01)
*H04N 23/56* (2023.01)

(52) U.S. Cl.
CPC .......... *H04N 23/957* (2023.01); *H04N 23/45* (2023.01); *H04N 23/56* (2023.01)

(58) Field of Classification Search
None
See application file for complete search history.

(56) References Cited

U.S. PATENT DOCUMENTS

| 7,841,750 B2 | 11/2010 | Wilcox et al. |
| 9,885,458 B2 | 2/2018 | Dross et al. |
| 11,009,786 B1 * | 5/2021 | Feng ................... G03B 21/2046 |
| 11,036,944 B1 * | 6/2021 | Feng ................... G06K 7/10881 |
| 2005/0284942 A1 | 12/2005 | Gurevich et al. |
| 2022/0100979 A1 * | 3/2022 | Fernandez-Dorado ..................... G06K 7/10831 |

FOREIGN PATENT DOCUMENTS

| EP | 1776653 B1 | 8/2012 |
| EP | 3822702 A1 | 5/2021 |
| JP | 3486804 B2 * | 1/2004 |

OTHER PUBLICATIONS

English translation of JP-3486804-B2, Komi, Jan. 2004 (Year: 2004).*
Extended European Search Report Mailed on Nov. 15, 2023 for EP Application No. 23175026, 9 page(s).

* cited by examiner

*Primary Examiner* — James M Hannett
(74) *Attorney, Agent, or Firm* — Alston & Bird LLP

(57) ABSTRACT

Embodiments of the present disclosure provide for improved projecting of aimer illumination utilizing an off-axis aimer alignment. Some embodiments reduce the negative impact of light reflectivity on components of an apparatus from an aimer illumination while simultaneously enhancing the intensity level of the aimer illumination at greater ranges from a target object. One example embodiment includes an integrated molded off-axis aimer lens including a light focusing lens having an input face and an output face, an axis redirecting lens having an angled front surface, where the axis redirecting lens is oriented along a first axis, where the axis redirecting lens is aligned with the output face of the light focusing lens, and an aimer light source aligned with the input face of the light focusing lens, where the aimer light source is oriented along a second axis that differs from the first axis.

20 Claims, 12 Drawing Sheets

FIG. 9A
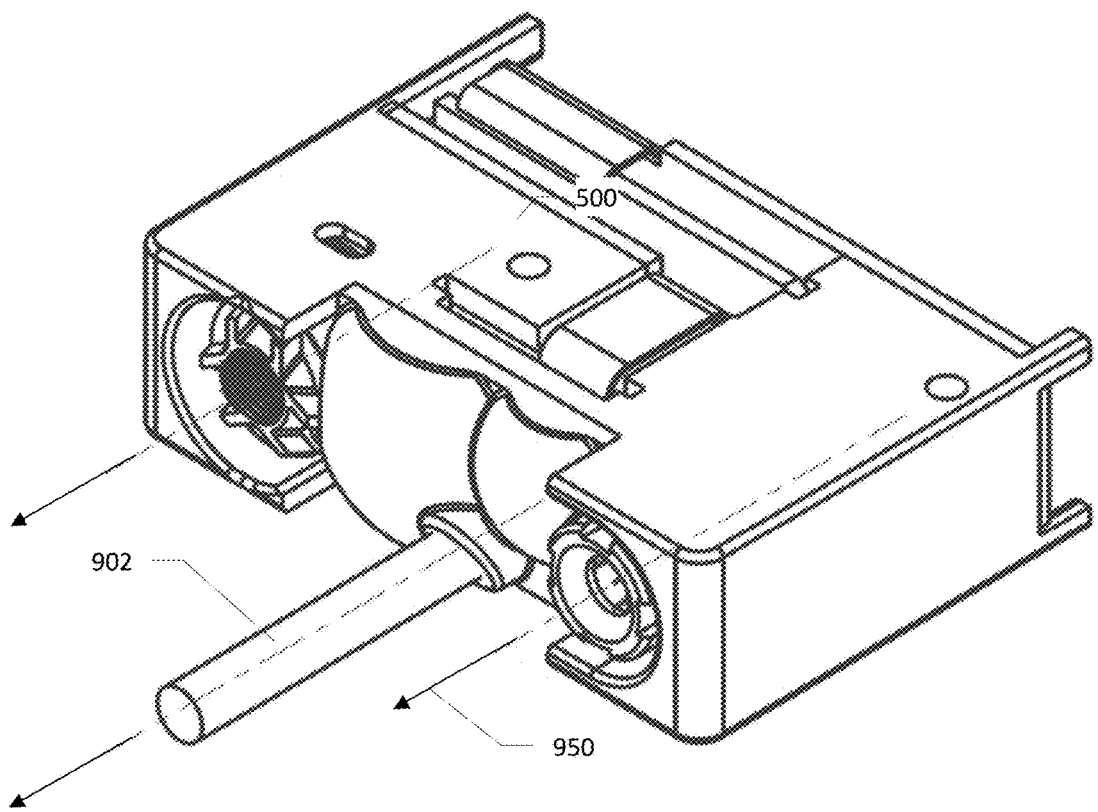
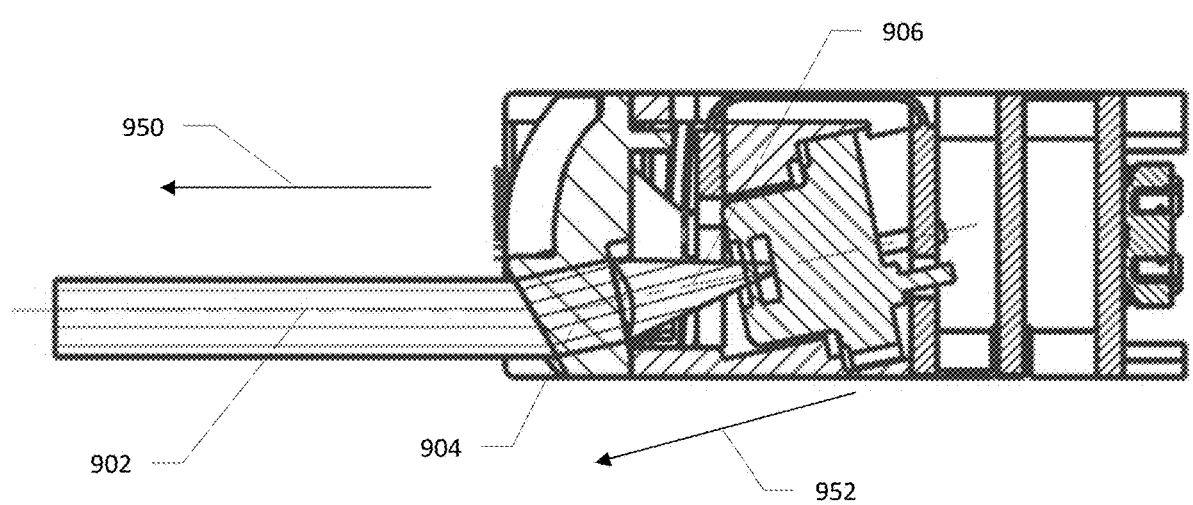
FIG. 9B

APPARATUSES, COMPUTER-IMPLEMENTED METHODS, AND COMPUTER PROGRAM PRODUCTS FOR OFF-AXIS ILLUMINATION PROJECTION AND USE

TECHNOLOGICAL FIELD

Embodiments of the present disclosure generally relate to illumination and imaging apparatuses ("imagers"), and specifically to utilizing off-axis illuminations functional in imagers including small frame imagers.

BACKGROUND

In various contexts, an aimer is utilized to produce a light pattern that projects into an environment. The aimer light pattern is projected in a particular direction, for example with the intent that an apparatus will be oriented such that the aimer light pattern is on or near a desired point (e.g., for capturing an image of that point). Such aimer light patterns are affected by a myriad of factors, including environment, size of the LED generating the light, distance to the object, and the like.

Applicant has discovered problems with current implementations of aimers and apparatuses including aimers. Through applied effort, ingenuity, and innovation, Applicant has solved many of these identified problems by developing embodied in the present disclosure, which are described in detail below.

BRIEF SUMMARY

In general, embodiments of the present disclosure are provided for off-axis illuminators and use. Other implementations for off-axis illuminators and use will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, an off-axis aimer apparatus is provided. An example apparatus includes a light focusing lens comprising an input face and an output face. The example apparatus further includes an axis redirecting lens having an angled front surface, where the axis redirecting lens is oriented along a second, wherein the axis redirecting lens is aligned with the output face of the light focusing lens. The example apparatus further includes an aimer light source aligned with the input face of the light focusing lens, where the aimer light source is oriented along a first axis that differs by a defined angle from the second axis.

In some embodiments of the example apparatus, the apparatus further includes a near-field illuminator, a far-field illuminator, a near-field imager, and a far-field imager. Additionally, in some embodiments of the example apparatus, the near-field imager is oriented along the second axis, and wherein the far-field imager is oriented along the second axis. Additionally or alternatively, in some embodiments of the example apparatus, apparatus includes an integrated illuminator-aimer lens, the integrated illuminator-aimer lens comprising a near-field lens of the near-field illuminator, a far-field lens of the far-field illuminator, the light focusing lens, and the axis redirecting lens embodied molded together.

In some embodiments of the example apparatus, the apparatus includes an integrated off-axis aimer projection lens, the integrated off-axis aimer projection lens comprising the light focusing lens and the axis redirecting lens.

In some embodiments of the example apparatus, the apparatus further includes at least one imager oriented along the second axis.

In some embodiments of the example apparatus, the apparatus further includes at least one processor communicatively coupled with the aimer light source, where the processor is configured to activate the aimer light source.

In some embodiments of the example apparatus, the apparatus further includes an apparatus chassis that houses and aligns each of the light focusing lens, the axis redirecting lens, and the aimer light source. Additionally, in some embodiments of the example apparatus, the housing comprises a height of between 7 millimeters and 6.8 millimeters inclusive. Additionally or alternatively, in some embodiments of the example apparatus, the housing comprises a depth of 16.2 millimeters and a width of 23.5 millimeters.

In some embodiments of the example apparatus, the aimer light source comprises at least one green laser diode.

In some embodiments of the example apparatus, the aimer light source comprises at least one red laser diode.

In some embodiments of the example apparatus, the light focusing lens comprises a collimating lens.

In some embodiments of the example apparatus, the angled front surface is flat.

In some embodiments of the example apparatus, the light focusing lens comprises an aspherical lens.

In some embodiments of the example apparatus, the apparatus further includes a chassis, where the chassis secures the light focusing lens, the axis redirecting lens, and the aimer light source in position.

In some embodiments of the example apparatus, the aimer light source generates light of a light wavelength, and where at least one lens property of the light focusing lens is based at least in part on the light wavelength.

In some embodiments of the example apparatus, the aimer light source generates light of a light wavelength, and wherein at least one lens property of the axis redirecting lens is based at least in part on the light wavelength.

In accordance with another aspect of the present disclosure, a computer-implemented method for using an off-axis aimer arrangement is provided. An example computer-implemented method includes generating, via an aimer light source, aimer light oriented in alignment with a light focusing lens, wherein the aimer light source is oriented along a first axis. The example computer-implemented method further includes projecting, via the light focusing lens to an axis redirecting lens, focused light from the aimer light. The example computer-implemented method further includes projecting, from an output face of the axis redirecting lens, an aimer illumination oriented along a second axis that differs by a defined angle from the first axis.

In accordance with another aspect of the present disclosure, an apparatus for using an off-axis aimer arrangement is provided. The apparatus includes at least one processor and at least one memory having computer-coded instructions thereon. The computer-coded instructions, in execution with the at least one processor, cause the apparatus to perform any of the computer-implemented methods described herein.

In accordance with another aspect of the present disclosure, a computer program product for using an off-axis aimer arrangement is provided. The computer program product includes at least one non-transitory computer-readable storage medium having computer program code stored thereon.

The computer program code, in execution with at least one processor, is configured for performing any one of the computer-implemented methods described herein.

BRIEF DESCRIPTION OF THE DRAWINGS

Figure 1:
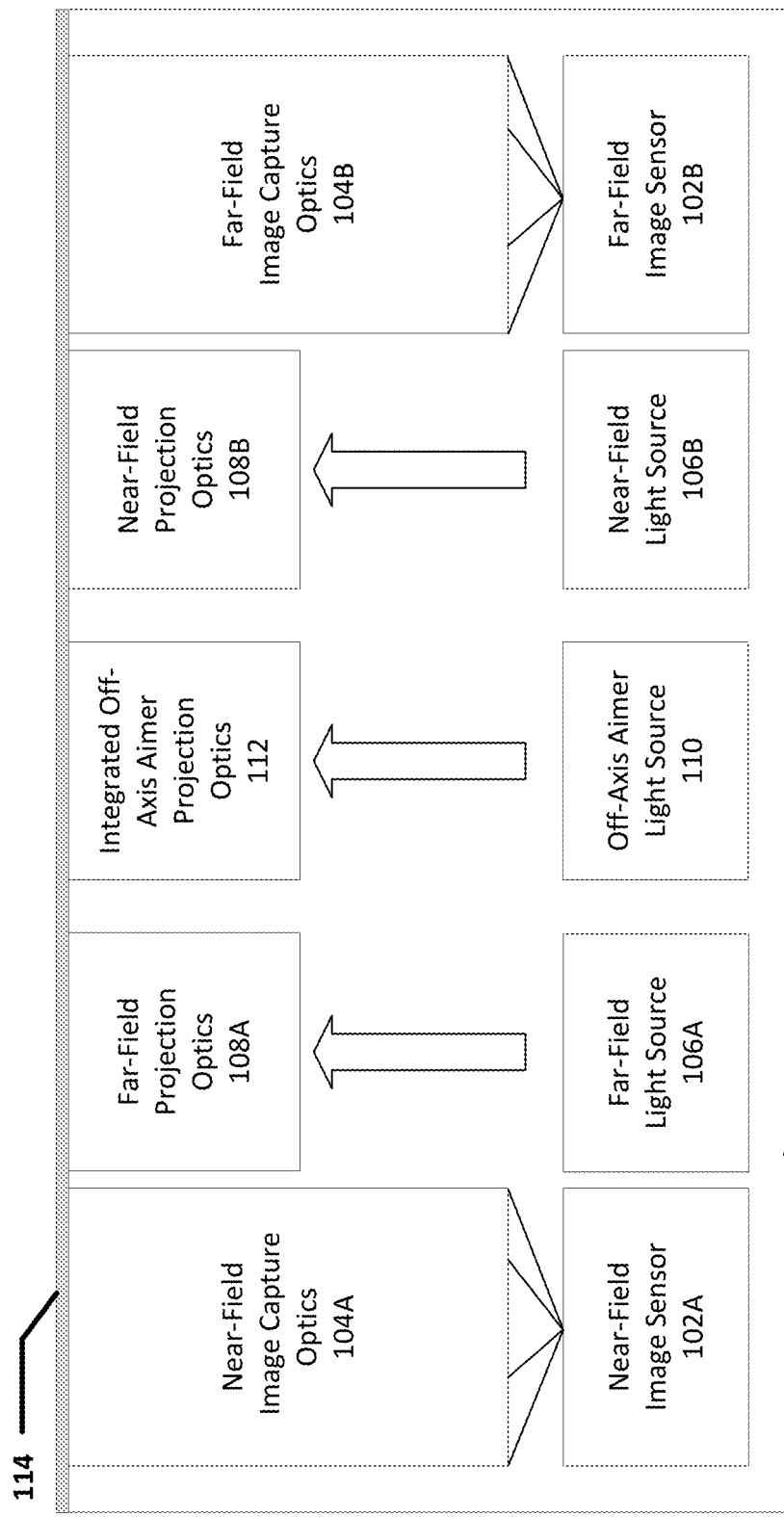
Figure 2:
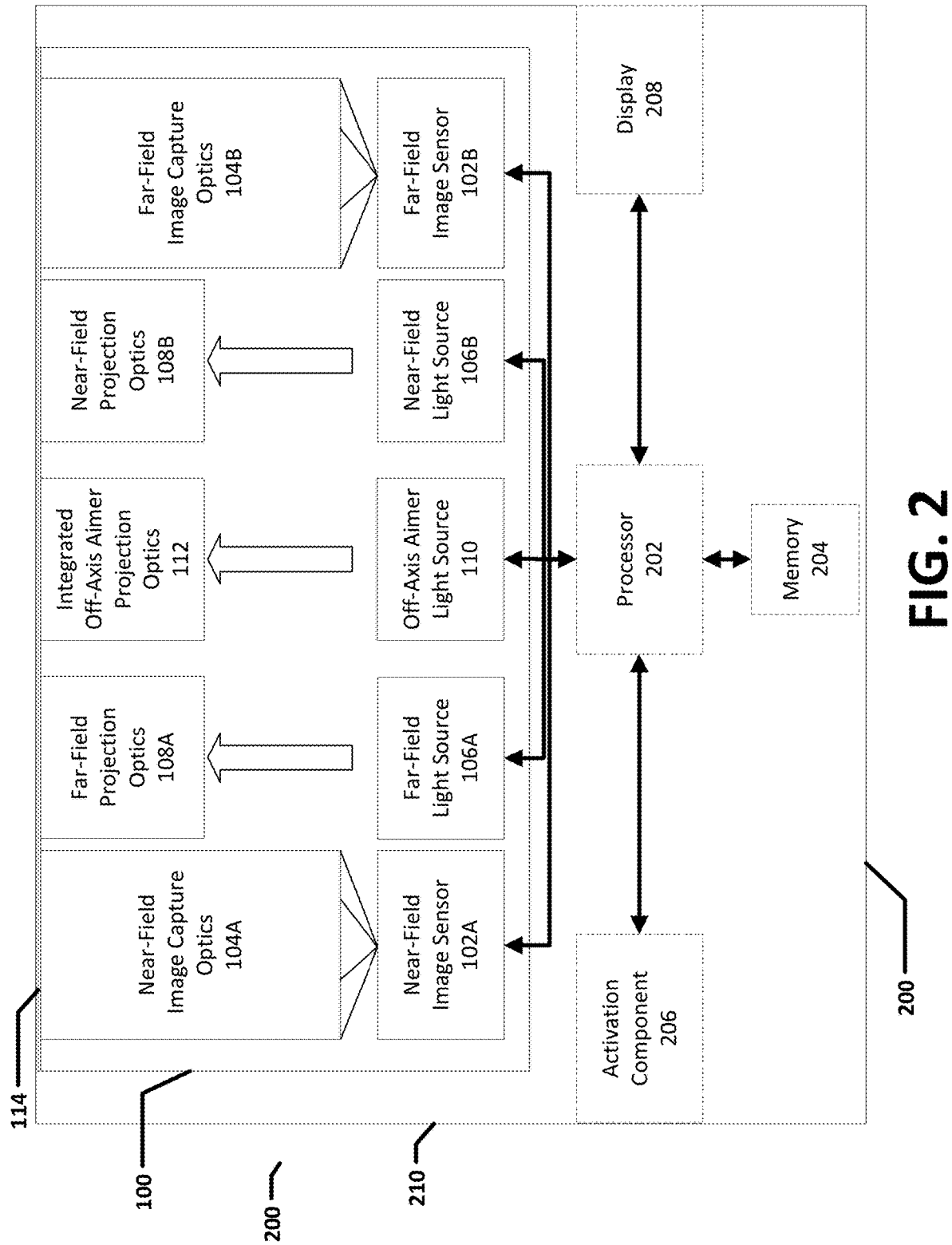
Figure 3:
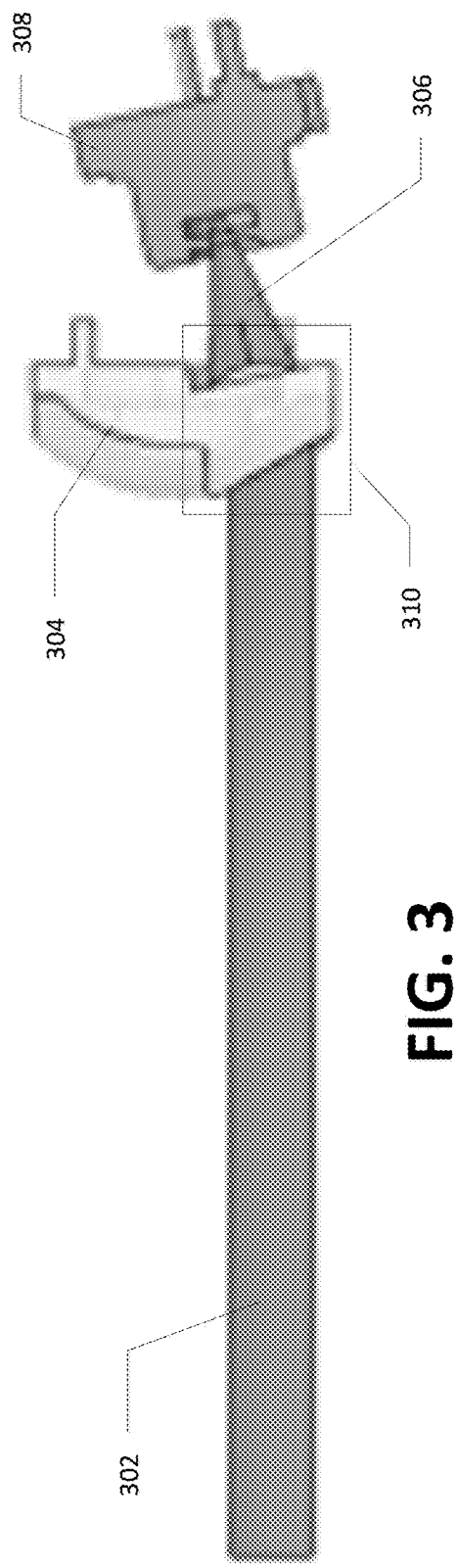
Figure 4:
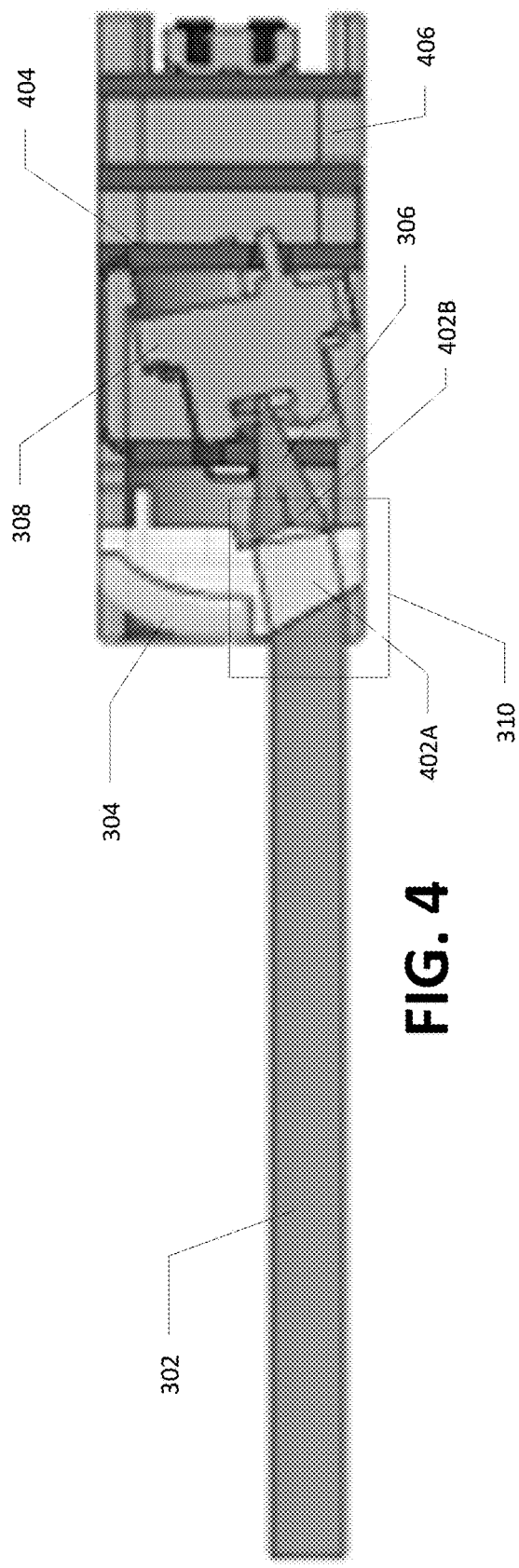
Figure 5A:
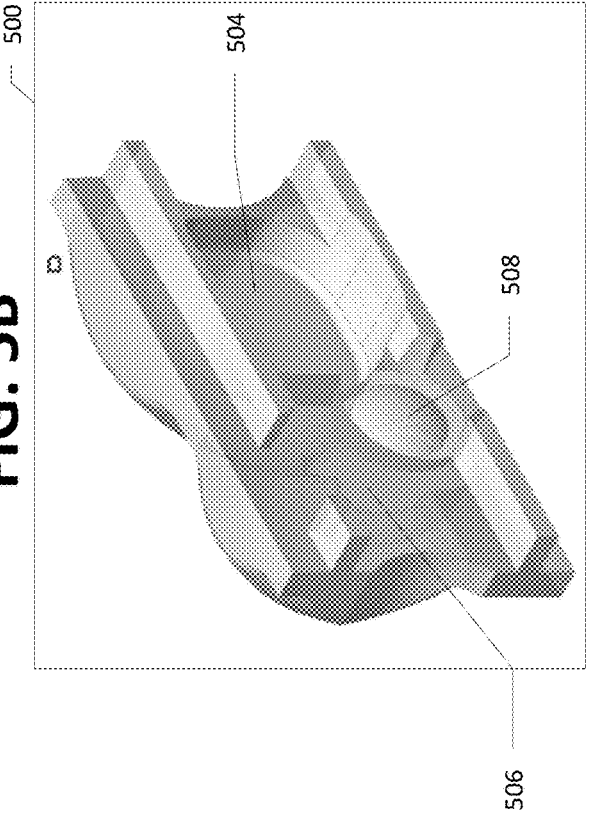
Figure 5B:
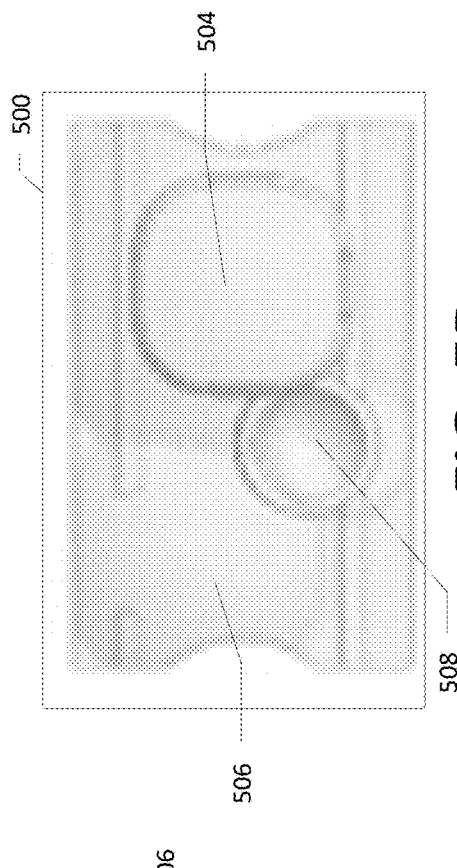
Figure 5C:
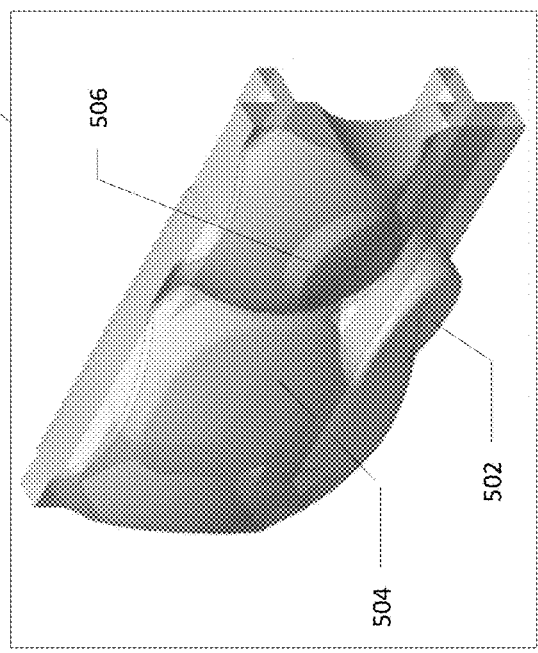
Figure 5D:
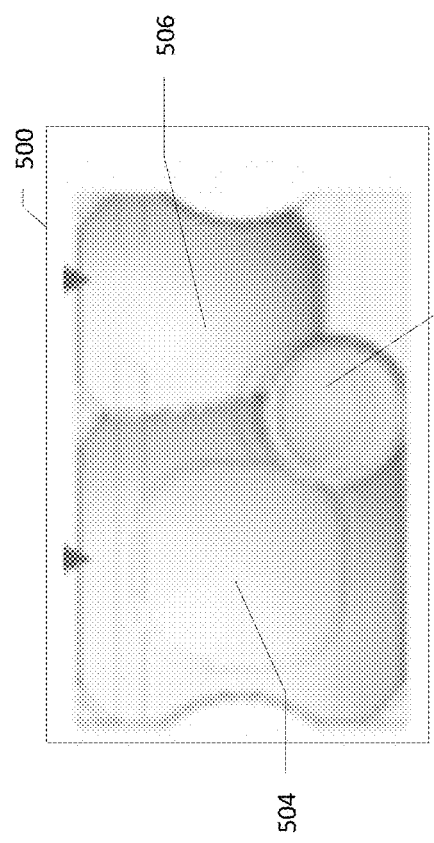
Figure 6A:
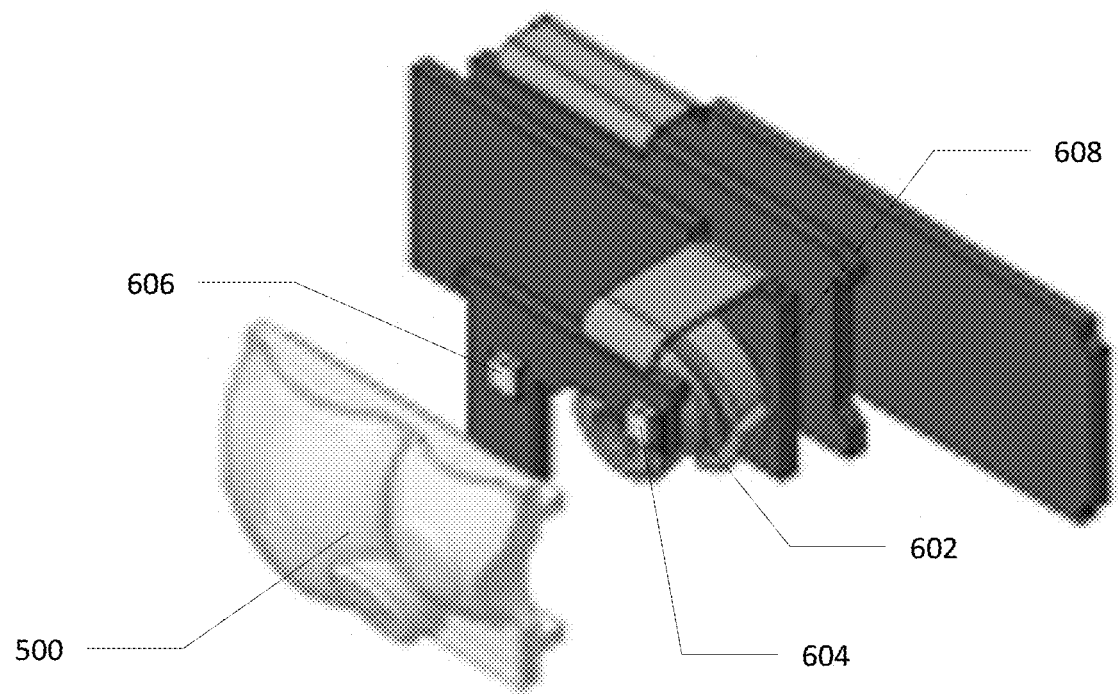
Figure 6B:
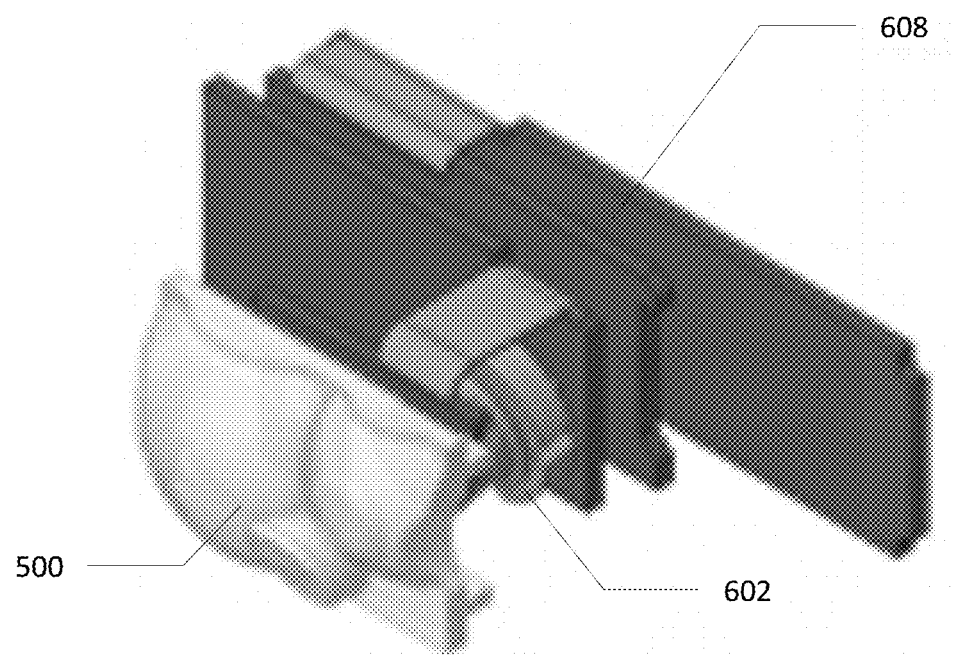
Figure 7:
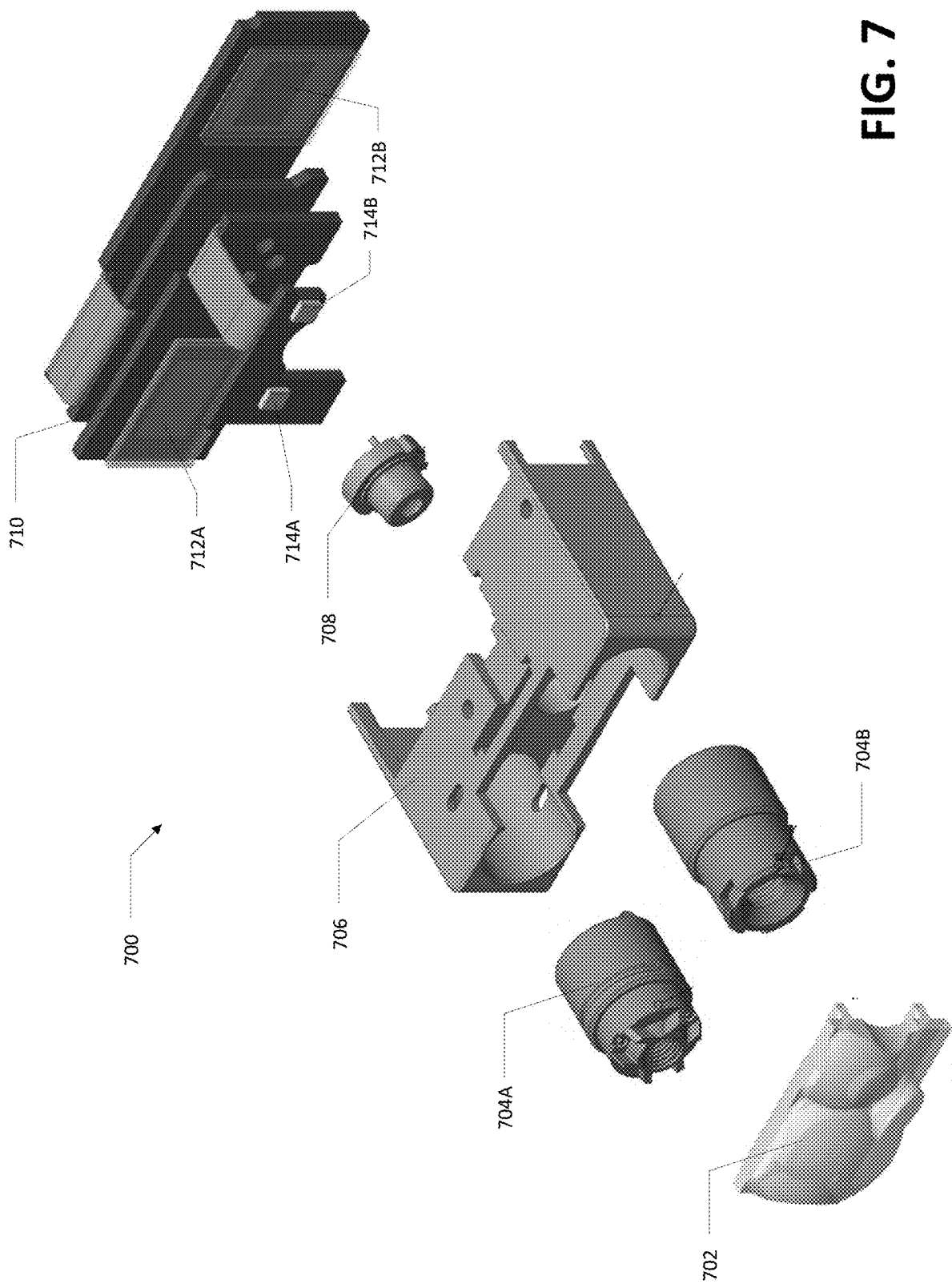
Figure 9C:
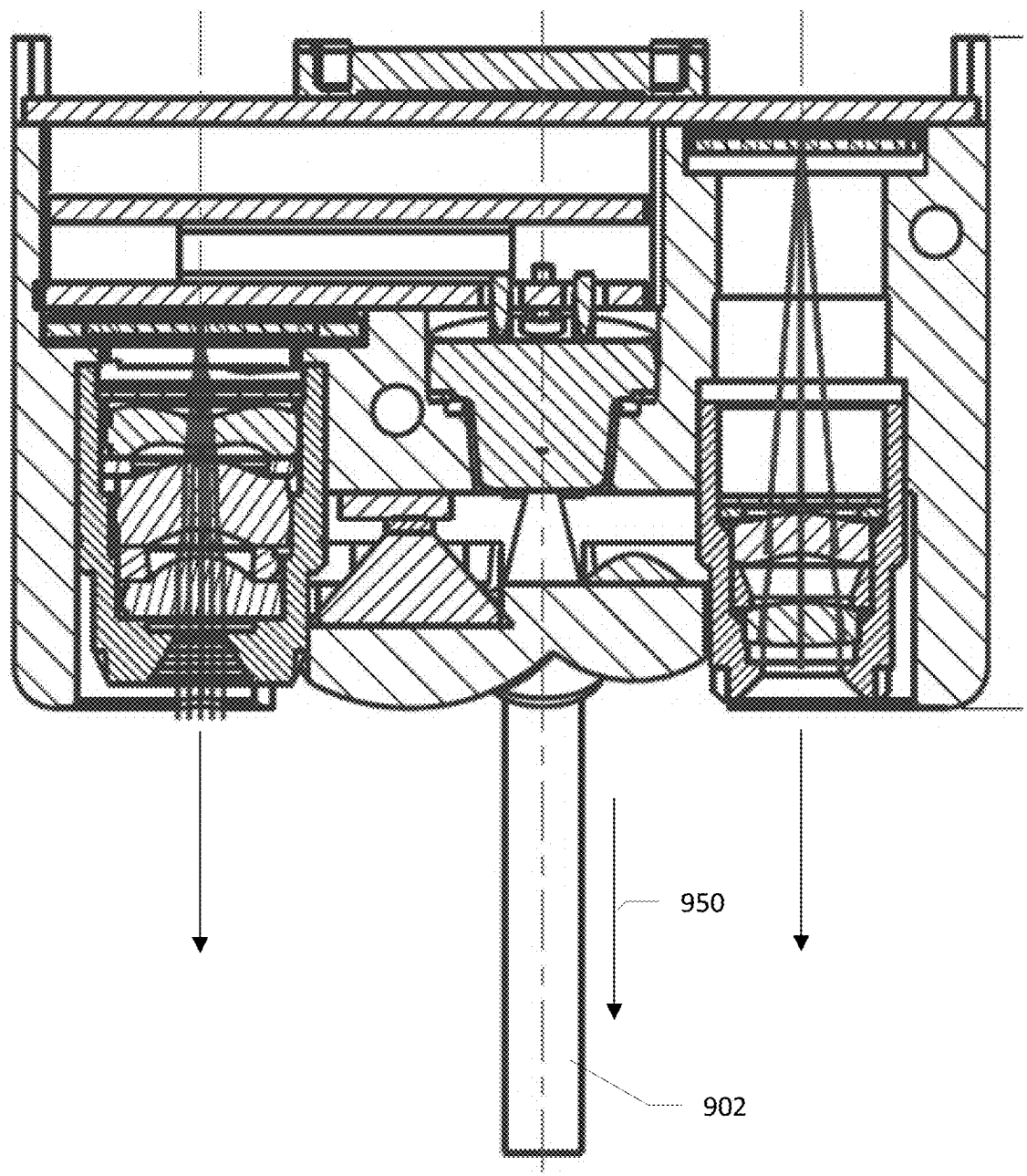
Figure 10:
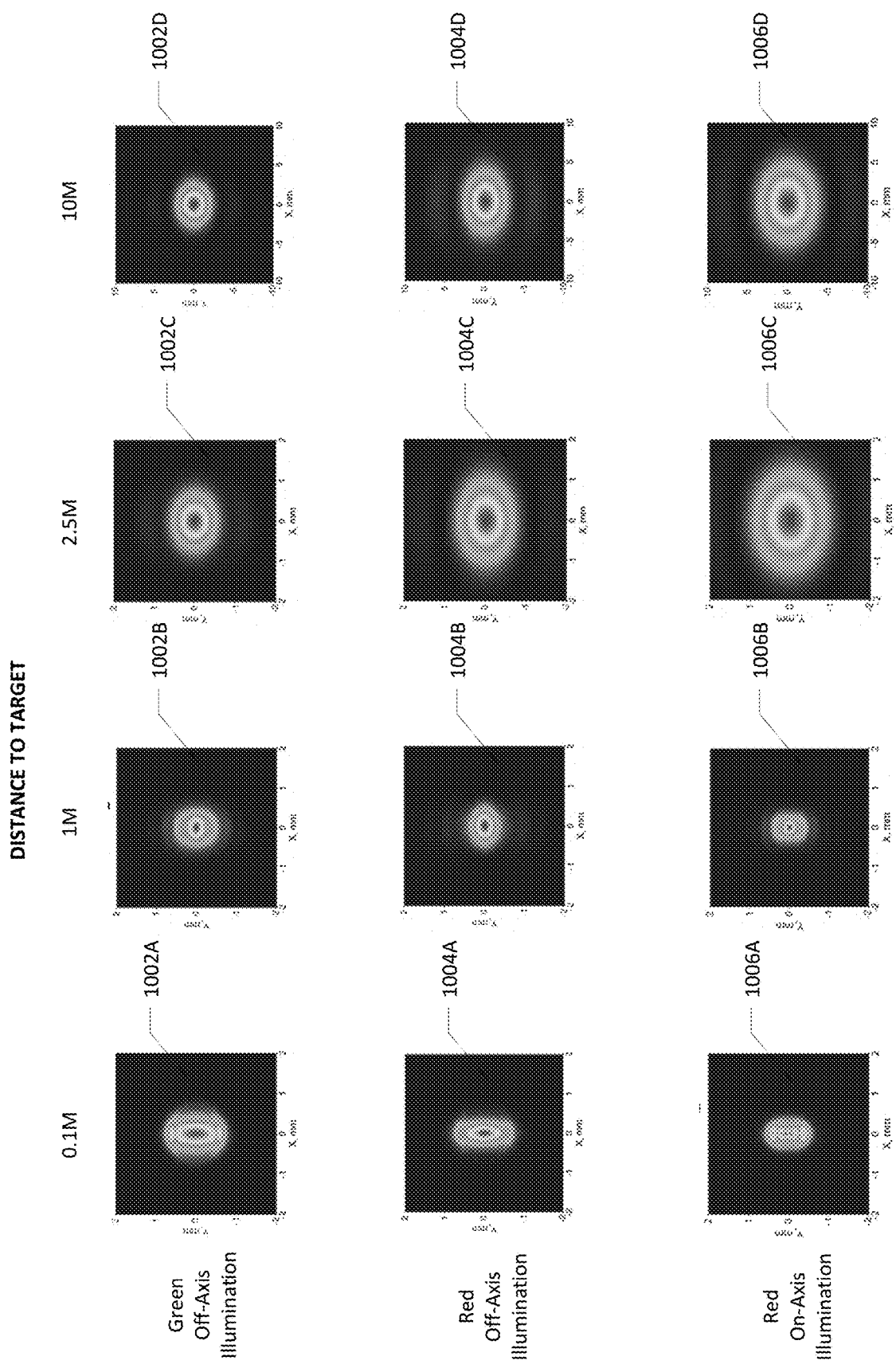
Figure 11:
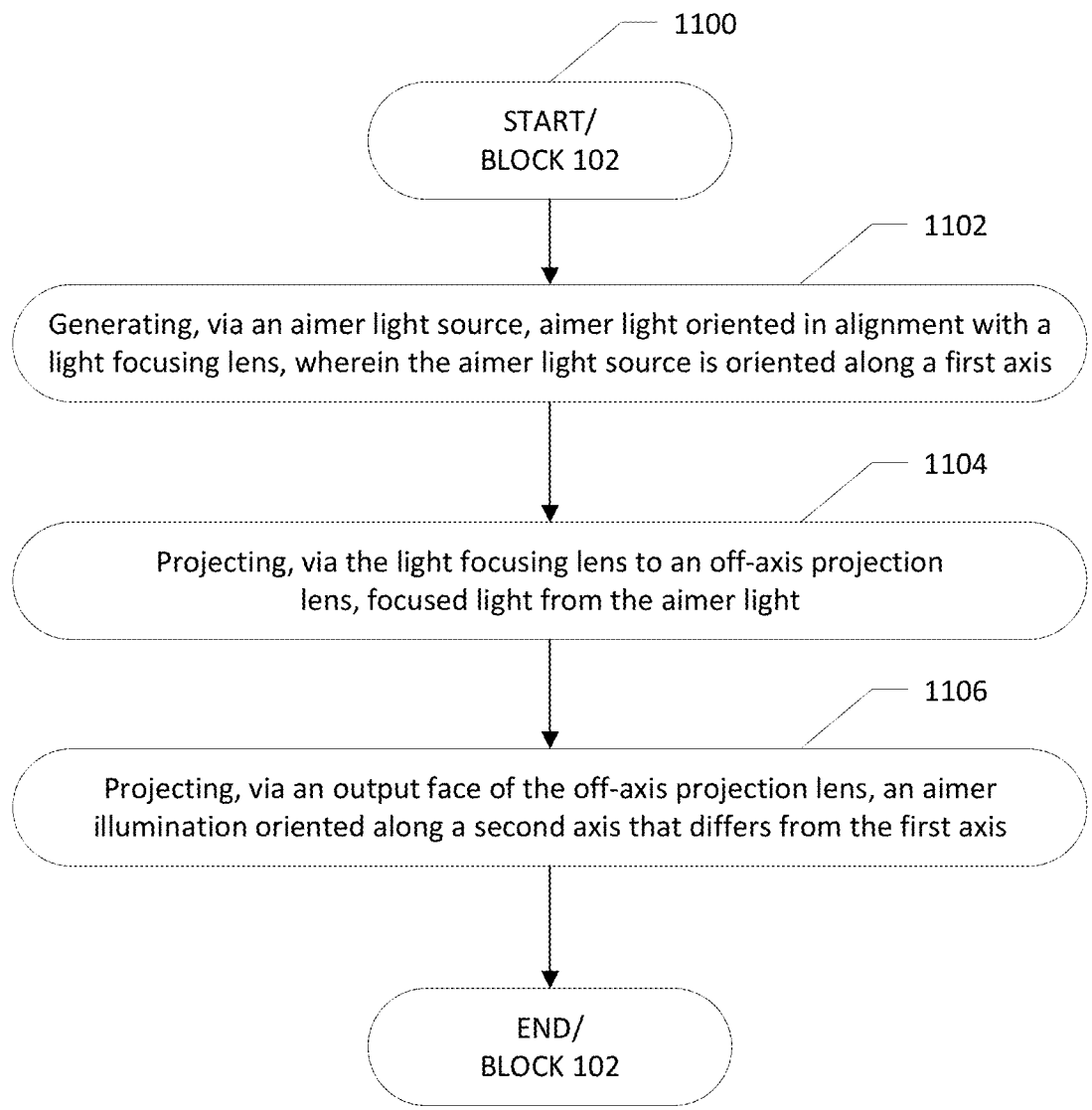

Having thus described the embodiments of the disclosure in general terms, reference now will be made to the accompanying drawings, which are not necessarily drawn to scale, and wherein:

FIG. 1 illustrates an example off-axis aimer imaging engine in accordance with at least one example embodiment of the present disclosure;

FIG. 2 illustrates a block diagram of an example off-axis aimer imaging apparatus in accordance with at least one example embodiment of the present disclosure;

FIG. 3 illustrates a visualization of an example off-axis aimer illuminator projecting an aimer illumination in accordance with at least one example embodiment of the present disclosure;

FIG. 4 illustrates a visualization of an example off-axis aimer illuminator in an apparatus projecting an aimer illumination in accordance with at least one example embodiment of the present disclosure;

FIGS. 5A, 5B, and 5C5D each illustrate a different perspective view of an integrated illuminator-aimer lens for off-axis illumination projecting in accordance with at least one example embodiment of the present disclosure;

FIGS. 6A and 6B each illustrate an example assembly of an off-axis illuminator in accordance with at least one example embodiment of the present disclosure;

FIG. 7 illustrates an exploded view of an example off-axis aimer apparatus in accordance with at least one example embodiment of the present disclosure;

FIGS. 8A, 8B, 8C, and 8D each illustrate a different views of an assembled example off-axis aimer apparatus in accordance with at least one example embodiment of the present disclosure;

FIGS. 9A, 9B, and 9C each illustrate a different view of an example aimer illumination projected by an example off-axis aimer apparatus in accordance with at least one example embodiment of the present disclosure;

FIG. 10 illustrates intensity level of different aimer illuminations projected by on-axis aimers and different off-axis aimers in accordance with at least one example embodiment of the present disclosure; and FIG. 11 illustrates a flowchart including operations of an example process for projecting an aimer illumination via an off-axis aimer illuminator in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, a device projects an aimer pattern into an environment. In the context of barcode scanners, for example, the barcode scanner projects an aimer pattern to be used in orienting the scanner towards a particular target to be scanned, such as via imager(s) of the scanner. The aimer pattern may be projected by a corresponding aimer illuminator of the device, where often the imager(s) and aimer illuminator(s) are housed within the same device. In this regard, the aimer pattern may be projected into an environment for use in orienting the device while the imagers of that device capture image(s) of the environment for processing, for example to perform barcode scanning (or detection and decoding of other machine-readable symbologies, such as other 2D or 3D codes, QR codes, and/or the like).

The inventors have identified that various aimer arrangements and constructions may cause particular problems in the operation of such scanners. For example, in various contexts, an aimer illuminator that is aligned in the same axis as one or more imagers may produce reflections that affect the operation of the imagers. For example, aimer light that is projected may be reflected off of other components on the interior of the device and interact with the imagers, negatively impacting the resulting images with improper data. Additionally, aimer patterns projected by such devices often have significant intensity drop-off as the distance between the aimer illuminator and the target (on which the aimer is projected) increases. In this regard, the aimer pattern may quickly become difficult for a user to see in a circumstance where the device's distance from the target increases. Further still, the size of such devices utilizing conventional components and arrangements is subject to the size of each component in the arrangement. Since such components often have a set size (e.g., diameter of an aimer LED), minimizing the form factor of the device is limited by such component sizes, making such conventional arrangements impossible to utilize in particularly small form factor implementations (e.g., mobile implementations under 7 millimeters). The inventors have determined that apparatuses having improved aimer arrangements is desirable.

Embodiments of the present disclosure utilize an off-axis aimer arrangement. In this regard, embodiments are disclosed that include an aimer light source aligned in a different axis than other component(s) of the embodiment. For example, in some example embodiments, an aimer illuminator is aligned at a downward-facing axis of a device that differs from one or more imager(s) aligned in a forward-facing axis of the device. Embodiments of the disclosure further include optical elements that redirect the aimer light projected by the aimer light source to be in alignment with such other components, for example in the forward-facing axis. In this regard, the aimer light source may project light at a different angle than the angle such light must ultimately must be projected towards to project a particular desired aimer pattern in alignment with field(s) of view capturable by corresponding imager(s).

Utilizing this off-axis arrangement, embodiments of the present disclosure provide various technical advantages in to aimer illumination projection, particularly in devices that include aimers and imagers. For example, utilizing the off-axis arrangement, embodiments of the present disclosure reduce or entirely prevent reflection of the aimer light off other components or objects in the environment from reflecting back onto the aimer, thus reducing heat and other negative impacts of such light from impacting operation of the aimer. Similarly, utilizing the off-axis arrangement, embodiments of the present disclosure reduce or entirely prevent reflection of the aimer light off other components or the environment from impacting one or more imager(s) positioned near or behind the aimer, thus reducing any negative impacts such reflections may have on these components with respect to component operation, corruption of image data captured by the imager, and/or the like. Additionally, embodiments of the present disclosure utilize the off-axis arrangement described herein to provide enhancements to the intensity of aimer illuminations at further ranges where conventional aimer arrangements often lose intensity and thus lose visibility to the human eye, making such embodiments better suited for use at any such range in addition to close range uses where intensity drop-off is not significant enough to cause impact to human visibility.

Definitions

The term "input face" with respect to a lens refers to a portion of the lens that is intended to receive light from a particular light source.

The term "output face" with respect to a lens refers to a portion of the lens that from which light received by the lens is projected.

The term "light focusing lens" refers to any lens that focuses light received via an input face of the lens to a particular focal point.

The term "axis redirecting lens" refers to any lens that receives light at a first axis and redirects the light in accordance with a second axis.

The term "integrated off-axis aimer projection lens" refers a single molded optical component that includes a first sub-lens embodying a light focusing lens and a second sub-lens embodying an axis redirecting lens.

The term "angled front surface" refers to a face of a lens that is tilted at a defined angle.

The term "aimer light source" refers to one or more light generating elements that produce light utilized to project an illumination used as an aimer.

The term "illuminator" refers to any light generating element and corresponding optical elements that project a particular illumination.

The term "imager" refers to any image sensor and corresponding optical elements that captures light representing a particular field of view. An imager generates and/or outputs an image representing the captured light.

The term "communicatively coupled" refers to a state of enabled transmission of data signals between components, devices, or systems, in a single direction or bi-directionally.

The term "apparatus chassis" refers to any one or more boundary, housing, or other physical component that surround, position, or otherwise house one or more component(s) of an apparatus.

The term "lens property" with respect to a lens refers to a configurable property that affects how the lens receives, redirects, and/or otherwise manipulates light received via the lens.

The term "off-axis" refers to a state of an assembly and/or apparatus having an aimer light source in alignment with a first axis that differs from a second axis in alignment with one or more other components associated with the aimer light source, where the light produced by the aimer light source is redirected to be in alignment with the second axis.

The term "on-axis" refers to a state of an assembly and/or apparatus having an aimer light source that is in alignment with one or more other components along a first axis. Aimer light produced via an aimer light source does not need to be redirected to be projected into the environment.

Example Apparatuses of the Disclosure

FIG. 1 illustrates an example off-axis aimer imaging engine in accordance with at least one example embodiment of the present disclosure. Specifically, as illustrated, the example off-axis aimer imaging engine is embodied by an off-axis aimer imaging engine 100. The off-axis aimer imaging engine 100 includes a plurality of imagers, specifically a near-field imager and a far-field imager, configured for capturing image data objects in a near field of view associated with the near-field imager and a far field of view associated with the far-field imager. In at least one example context, the off-axis aimer imaging engine 100 is configured for capturing images for purposes of barcode reading at different ranges, such as a close-range using the near-field imager and a far-range using the far-field imager.

It will be appreciated that although FIG. 1 is depicted and described with respect to a multi-imager and multi-illuminator engine, in other embodiments an off-axis aimer arrangement may be utilized in other embodiments including a single imager and/or a single illuminator. For example, some embodiments include an off-axis aimer together with a single illuminator and a single imager. Alternatively, some embodiments include an off-axis aimer together with a single illuminator and a plurality of imagers, or alternatively a single imager and a plurality of illuminators. In this regard, it should be appreciated that the particular engines, arrangement of imagers, and/or arrangement of illuminators described herein should not limit the scope and spirit of this disclosure or the claims appended hereto.

As illustrated, the off-axis aimer imaging engine 100 includes near-field image capture optics 104A. The near-field capture optics 104A may be embodied by one or more lens(es) and/or other optical components configured to enable light to transverse through and interact with a corresponding image sensor, specifically the near-field image sensor 102A. In this regard, the near-field image capture optics 104A may define a particular field of view that may be captured by the near-field image sensor 102A. In some embodiments, the near-field image capture optics 104A defines a near field of view associated with a first focal range, such that objects located at and/or within a determinable offset from the first focal range may be clear in images captured by the near-field image sensor 102A.

Additionally as illustrated, the off-axis aimer imaging engine 100 includes far-field image capture optics 104B. The far-field image capture optics 104B may be embodied by one or more lens(es) and/or other optical components configured to enable light to transverse through and interact with a corresponding image sensor, specifically the far-field image sensor 102B. In this regard, the far-field image capture optics 104B may define a second field of view that may be captured by the far-field image sensor 102B. In some embodiments, the far-field image capture optics 104B defines a far field of view that is associated with a second focal range, such that objects located at and/or within a determinable offset from the second focal range may be clear in images captured by the far-field image sensor 102B. In some such embodiments, the near field of view is wider than the far field of view, such that the captured data represents more of the environment within view of the off-axis aimer imaging engine 100. The far field of view may be narrower than the near field of view, and focused on a further range to enable clearer capture of objects located at a greater range than objects that can be captured clearly in the near field of view.

In some embodiments, for example as illustrated, each imager (or a subset thereof) is associated with one or more components for projecting an illumination configured for illuminating the field of view defined by the imager. For example, as illustrated, the off-axis aimer imaging engine 100 additionally comprises the near-field light source 106B and corresponding near-field projection optics 108B. The near-field light source 106B is configured to project light in the direction of the near-field projection optics 108B. This light is refracted through the near-field projection optics 108B to project a near-field illumination, which may be produced in a desired pattern based on the configuration and design of the near-field projection optics 108B. In this regard, the illumination produced by light exiting the near-field projection optics 108B may illuminate a particular field of view, such as the near field of view capturable by the near-field image sensor 102A. It should be appreciated that in some embodiments, the near-field light source 106B and/or near-field projection optics 108B may be designed such that the near field illumination specifically illuminates the near field of view, and may affect the functioning of the far-field image sensor 102B without negatively affecting the functioning of the near-field image sensor 102A. For example, due at least in part to the close proximity between the components, reflected light may interact with the far-field image sensor 102B and negatively affect the images created via far-field image sensor 102B.

Similarly, the off-axis aimer imaging engine 100 additionally comprises the far-field light source 106A and corresponding far-field projection optics 108A. The far-field light source 106A is configured to produce light in the direction of the far-field projection optics 108A. This light is refracted through the far-field projection optics 108A to project a far-field illumination, which may be produced in a desired pattern based on the configuration and design of the far-field projection optics 108A. In this regard, the far-field illumination may illuminate a particular field of view, such as the far field of view capturable by the far-field image sensor 102B. It should be appreciated that the far-field light source 106A and/or far-field projection optics 108A may be designed such that the far-field illumination specifically illuminates the far field of view without producing sufficient reflections to negatively impact the operations of the near-field image sensor 102A and/or far-field image sensor 102B.

Additionally or alternatively, optionally in some embodiments, the off-axis aimer imaging engine 100 further comprises an off-axis aimer light source 110. The off-axis aimer light source 110 is arranged in alignment with a first axis, for example angled downward from a forward-facing axis defined by the imager(s) of the off-axis aimer imaging engine 100. In this regard, the imager(s) may capture particular fields of view, with the forward-facing axis defined by the axis normal to the fields of view. The off-axis aimer light source 110 is configured to produce light in the direction of the integrated off-axis aimer projection optics 112. For example, the aimer light source comprises one or more laser diodes and/or high intensity LED(s) configured to produce sufficiently powerful and/or concentrated light. The light is redirected through the integrated off-axis aimer projection optics 112 to produce an aimer illumination in alignment with the fields of view capturable via the far-field image sensor 102B in conjunction with the far-field image capture optics 104B and/or the far-field image sensor 102A in conjunction with the far-field image capture optics 104A, which may be produced in a desired pattern based on the configuration and design of the integrated off-axis aimer projection optics 112. In one example context, for purposes of barcode scanning for example, the aimer pattern may be projected as a laser line pattern.

The off-axis aimer imaging engine 100 further comprises a protective window 114. The protective window 114 comprises one or more optical components configured to enable produced light to exit the off-axis aimer imaging engine 100, and incoming light to be received through the image capture optics 104A and 104B to interact with the corresponding image sensors 102A and 102B. In some contexts, the protective window 114 reflects at least a portion of the illumination projected by the far-field projection optics 108A and/or near-field projection optics 108B, and which may interact with the image sensor(s) 102A and/or 102B through light leak or through the corresponding image capture optics 104A and/or 104B. For example, at least a portion of the near field illumination may be reflected towards the far-field image sensor 102B, and negatively affect the operation of the far-field image sensor 102B if triggered when an illumination pulse is occurring. In at least one example context, the far-field light source 106A produces light that is concentrated and/or otherwise sufficiently designed such that the far-field illumination projected by the far-field projection optics 108A is not sufficiently reflected to negatively affect the near-field image sensor 102A.

It should be appreciated that, in other embodiments, an off-axis aimer imaging engine may include any number of image capture optics, image sensors, light sources, and/or any combination thereof. In this regard, the engine may be extended to capture any number of field of views, which may each be associated with a corresponding illuminator designed for specifically illuminating a corresponding field of view. One or more of the light source(s) may negatively affect operation of another illuminator. In such circumstances, when one such light source is active, the negatively affected image sensor may be activated between illumination pulses of the light source as described herein. Such operation may be implemented for any combination(s) of light source and image sensor.

In some embodiments, the off-axis aimer imaging engine 100 includes one or more processing components (e.g., a processor and/or other processing circuitry) for controlling activation of one or more components of the off-axis aimer imaging engine 100. For example, in at least one example embodiment, the off-axis aimer imaging engine 100 includes a processor configured for activating the near-field light source 106B and/or far-field light source 106A to produce illumination(s), and/or activating the near-field image sensor 102B and/or far-field image sensor 102A to capture data embodying image representations of the corresponding visible fields of view. In some such contexts, the processor is embodied by any one of a myriad of processing circuitry implementations, for example as a FPGA, ASIC, microprocessor, CPU, and/or the like. In at least some embodiments, the processor may be in communication with one or more memory device(s) having computer-coded instructions enabling such functionality when executed by the processor(s). In some embodiments, it should be appreciated that the processor may include one or more sub-processors, remote processors (e.g., "cloud" processors) and/or the like, and/or may be in communication with one or more additional processors for performing such functionality. For example, in at least one embodiment, the processor may be in communication, and/or operate in conjunction with, another processor within an imaging apparatus, for example the processor 202 as depicted and described with respect to FIG. 2.

FIG. 2 illustrates an example off-axis aimer imaging apparatus, in accordance with at least one example embodiment of the present disclosure. Specifically, FIG. 2 illustrates an example off-axis aimer imaging apparatus 200. As illustrated, the off-axis aimer imaging apparatus 200 comprises an apparatus chassis 210 for housing the various components of the apparatus. In this regard, it should be appreciated that the apparatus chassis may be embodied in any of a myriad of chassis designs, using any of a myriad of materials, and/or the like, suitable to position the various components of the off-axis aimer imaging apparatus 200 for operation. In at least one example context, the apparatus chassis 210 may be embodied as a handheld apparatus chassis, wearable chassis, and/or the like.

The off-axis aimer imaging apparatus 200 comprises the off-axis aimer imaging engine 100 as described above with respect to FIG. 1. The off-axis aimer imaging apparatus 200 further comprises a processor 202. The processor 202 (and/or any other co-processor(s) and/or processing circuitry assisting and/or otherwise associated with the processor 202) may provide processing functionality to the off-axis aimer imaging apparatus 200. In this regard, the processor 202 may be embodied in any one of a myriad of ways and may, for example, include one or more processing devices configured to perform independently. Additionally or alternatively, the processor may include one or more processors configured to operate in tandem via a bus to enable independent execution of instructions, pipelining, and/or multi-threading, and/or the like. The use of the terms "processor," "processing module," and/or processing circuitry" may be understood to include a single-core processor, a multi-core processor, multiple processors, microprocessor, other central processing unit ("CPU"), and/or one or more remote or "cloud" processors. In other embodiments, the processor 202 is configured as one or more field-programmable gate array(s) ("FPGA(s)"), application-specific integrated circuit(s) ("ASIC(s)"), and/or the like.

In at least one example embodiment, the processor 202 is configured to provide functionality for operating one or more components of the off-axis aimer imaging apparatus 200. For example, the processor 202 may be configured for activating the far-field light source 106A, the near-field light source 106B, and/or the off-axis aimer light source 110. Additionally or alternatively, in some embodiments, the processor 202 is configured for activating the near-field image sensor 102A and/or far-field image sensor 102B to expose the corresponding image sensor, and/or for reading out the captured data to generate an image based on the data captured during exposure. Additionally or alternatively, in some embodiments, the processor 202 is configured to process the captured image(s), for example based on one or more image processing task(s). In one such example context, the processor 202 is configured to perform attempt to detect and decode visual indicia(s), such as 1D and/or 2D barcodes, from a captured image. In this regard, the processor 202 may be configured to utilize a visual indicia parsing algorithm and/or a visual indicia decoding algorithm to provide such functionality.

Additionally or alternatively, optionally in at least some embodiments, the off-axis aimer imaging apparatus 200 further includes activation component 206. The activation component 206 may include hardware, software, firmware, and/or a combination thereof, configured to indicate initiation (and/or termination) of desired functionality by the user. For example, the activation component 206 may transmit an activation signal to cause the processor 202 to begin operation of the off-axis aimer imaging engine 200, for example to begin illumination by one or more of the light sources 106A and/or 106B, and/or capture by the image sensors 102A and/or 102B. Additionally or alternatively, the activation component 206 may transmit a deactivation signal to the processor 202 to terminate the corresponding functionality, for example to cease scanning via the illuminator(s) and/or image sensor(s). In some embodiments, the activation component 206 is embodied by one or more buttons, triggers, and/or other physical components on the body of the apparatus chassis 210. For example, in at least one example context, the activation component 206 is embodied by one or more "trigger" components that, when engaged by an operator (e.g., when an operator squeezes the trigger), transmits a signal to the processor 202 to initiate corresponding functionality. In some such embodiments, the activation component may transmit a deactivation signal to the processor 202 to cease such functionality when the component is disengaged by the operator (e.g., when the operator releases the trigger). Alternatively or additionally, in at least some embodiments, the activation component 206 is embodied without any components for direct engagement by an operator. For example, the activation component 206 may be embodied by hardware and/or software, or a combination thereof, for detecting the off-axis aimer imaging apparatus 200 has been raised and/or positioned to a predefined "scanning" position, and/or lowered from that position to trigger deactivation.

Additionally or alternatively, optionally in at least some embodiments, the off-axis aimer imaging apparatus 200 further includes a display 208. The display 208 may be embodied by a LCD, LED, and/or other screen device configured for data provided by one or more components of the off-axis aimer imaging apparatus 200. For example, in some embodiments, the display 208 is configured for rendering a user interface comprising text, images, control elements, and/or other data provided by the processor 202 for rendering. In some embodiments, for example, the display 208 is embodied by a LCD and/or LED monitor integrated with the surface of the apparatus chassis 210 and visible to an operator, for example to provide information decoded from a barcode and/or associated with such information decoded from a barcode. In one or more embodiments, the display 208 may be configured to receive user engagement, and/or may transmit one or more corresponding signals to the processor 202 to trigger functionality based on the user engagement. In some such embodiments, the display 208 to provide user interface functionality embodying activation component 206, for example to enable an operator to initiate and/or terminate scanning functionality via interaction with the user interface.

Additionally or alternatively, optionally in at least some embodiments, the off-axis aimer imaging apparatus 200 further includes a memory 204. The memory 204 may provide storage functionality, for example to store data processed by the off-axis aimer imaging apparatus 200 and/or instructions for providing the functionality described herein. In some embodiments, the processor 202 may be in communication with the memory 204 via a bus for passing information among components of the apparatus, and/or for retrieving instructions for execution. The memory 204 may be non-transitory and may include, for example, one or more volatile and/or non-volatile memories. In other words, for example, the memory 204 may be an electronic storage device (e.g. a computer readable storage medium). The memory 204 may be configured to store information, data, content, applications, instructions, or the like, for enabling the apparatus 200 to carry out various functions in accordance with example embodiments of the present disclosure. In some embodiments, the memory 204 includes computer-coded instructions for execution by the processor 202, for example to execute the functionality described herein and/or in conjunction with hard-coded functionality executed via the processor 202. For example, when the processor 202 is embodied as an executor of software instructions, the instructions may specially configure the processor 202 to perform the algorithms and/or operations described herein when the instructions are executed.

Non-limiting examples implementations of the off-axis aimer imaging engine 100 and off-axis aimer imaging apparatus 200 are described in U.S. patent application Ser. No. 16/684,124 filed Nov. 14, 2019, titled "INTEGRATED ILLUMINATION-AIMER IMAGING APPARATUSES," the contents of which are incorporated by reference in its entirety herein. It should be appreciated that one or more of such components may be configurable to provide the flicker reduction as described herein.

Example Aimer Illumination Projection of the Disclosure

FIG. 3 illustrates a visualization of an example off-axis aimer illuminator producing an aimer illumination in accordance with at least one example embodiment of the present disclosure. Specifically, the off-axis aimer illuminator as illustrated includes an aimer light source 308 and an integrated illuminator-aimer lens 304. In some embodiments, the aimer light source 308 embodies a LED angled downwards in accordance with a particular axis (e.g., a first axis), such that the aimer light source 308 is oriented in alignment with particular optical component(s) of the integrated illuminator-aimer lens 304, for example an integrated off-axis aimer projection lens 310.

The aimer light source 308 produces aimer light 306. The integrated off-axis aimer projection lens 310 includes a light focusing lens and an axis redirecting lens. The light focusing lens receives aimer light 306 produced by the aimer light source 308 at an input face. The input face of the light focusing lens is similarly aligned at an angle to receive the aimer light 306 produced by the aimer light source 308.

As illustrated, the integrated off-axis aimer projection lens 310 refracts and/or otherwise manipulates the aimer light 306. For example, in some embodiments, the integrated off-axis aimer projection lens 310 focuses and/or otherwise collimates the aimer light 306. Additionally, as illustrated the integrated off-axis aimer projection lens 310 refracts the aimer light 306 to redirect the aimer light in a forward-facing direction (e.g., to the left of the illustrated image).

The aimer light 306 is focused and refracted by such optics to project a corresponding aimer illumination 302. Specifically as illustrated, the integrated off-axis aimer projection lens 310 projects the aimer illumination 302 at an output face, for example of an axis redirecting lens. The aimer illumination 302 is oriented in alignment with a different axis than the angled axis in which the aimer light source 308 is aligned. For example, the aimer illumination 302 is projected along a forward-facing axis, for example normal to a field of view capturable by one or more corresponding imager(s). In this regard, upon completion of the focusing and/or refraction, the aimer illumination 302 may be projected into the environment and onto a target object (e.g., to be imaged and scanned).

FIG. 4 illustrates a visualization of an example off-axis aimer illuminator in an apparatus producing an aimer illumination in accordance with at least one example embodiment of the present disclosure. Specifically, FIG. 4 illustrates the off-axis aimer illuminator depicted in FIG. 3 together with supporting circuitry 404 into a particular apparatus chassis 406. In some embodiments, the supporting circuitry 404 includes one or more printed circuit board(s), processor(s), interface(s), pin(s), and/or other hardware that communicatively couples with the aimer light source 308 to enable activation and/or deactivation of the aimer light source 308. In this regard, the aimer light 306 may only be generated upon receiving, via the supporting circuitry 308, signal(s) that activate the aimer light source 308. The supporting circuitry 404 may be communicatively coupled with other component(s) as well, for example one or more other light source(s) of illuminator(s), one or more image sensor(s) of imager(s), and/or the like. As illustrated, the supporting circuitry 404 includes a printed circuit board having the aimer light source 308 soldered or otherwise connected to said printed circuit board in a manner that enables transmission of data signals to and/or from the aimer light source 308.

The apparatus chassis 406 defines particular cavities for each component of the off-axis aimer illuminator, as well as the supporting circuitry 404 associated therewith. In this regard, the apparatus chassis 406 includes defined cavities that fit and position the integrated illuminator-aimer lens 304 in front of the aimer light source 308, and similarly positions the supporting circuitry 404 communicatively coupled to the aimer light source 308. Additionally or alternatively, in some embodiments, the apparatus chassis 406 includes one or more supporting arm(s) and/or other mechanism(s) that secure the components in place physically (e.g., via a pin, securing arm, screw, or other physical mean) or chemically (e.g., via a glue, bond, or other chemical mean). In some embodiments, the apparatus chassis 406 is designed such that when the aimer light source 308 is secured, the aimer light source 308 is in alignment with the input face for the light focusing lens of the integrated off-axis aimer projection lens 310.

Additionally, FIG. 4 depicts the integrated off-axis aimer projection lens 310 in a semi-transparent manner to further enable visualization of the light focusing and redirection performed by individual subcomponents thereof. As illustrated, the integrated off-axis aimer projection lens 310 includes a sub-portion embodying a light focusing lens 402B, and a sub-portion embodying an axis redirecting lens 402A. The light focusing lens 402B includes an input face that receives the aimer light 306 from the aimer light source 308 and focuses the aimer light 306 for further manipulation. In some embodiments, the light focusing lens 402B does not have any output face, and the focused aimer light is immediately flows into internal optical components of the axis redirecting lens 302A. In some embodiments, the light focusing lens 402B embodies a light collimator.

The axis redirecting lens 402A manipulates the orientation of the light focused or otherwise collimated via the light focusing lens 402B to redirect the light towards a forward-facing direction. In some embodiments, the axis redirecting lens 402A includes one or more prism(s) that redirect the aimer light towards the forward-facing axis. Additionally, the axis redirecting lens 402A includes an output face via which the aimer illumination 302 is output. In some embodiments, the output face is angled towards the forward-facing axis to similarly prevent the aimer illumination 302 or other light from reflecting back into the axis redirecting lens 402A and towards the aimer light source 404. Additionally, in some embodiments, the output face of the axis redirecting lens 402A is flat.

In some such embodiments, the flat output face embodies the optical element that functions to bend, refract, or otherwise redirect light in a particular direction. In some embodiments, the output face may serve additional optical functions as well, whether flat or not flat. For example, in some embodiments, the output face embodies a cylindrical or other patternized front that converts light to a particular desired output pattern (e.g., a line, a speckle pattern, a cross, and/or the like).

FIG. 5A-5D each illustrate a different perspective view of an integrated illuminator-aimer lens for off-axis illumination projecting in accordance with at least one example embodiment of the present disclosure. Specifically, FIGS. 5A-5D depict an integrated illuminator-aimer lens 500. The integrated illuminator-aimer lens 500 includes optical components for projecting illuminations of a plurality of field illuminators and an aimer illumination via an off-axis aimer. In some embodiments, the integrated illuminator-aimer lens 500 is a specific example implementation of the integrated illuminator-aimer lens 304.

In some embodiments, the integrated illuminator-aimer lens 500 is molded as a single piece, such that repositioning the integrated illuminator-aimer lens 500 repositions all subcomponents thereof. Alternatively or additionally, in some embodiments, the integrated illuminator-aimer lens 500 includes a plurality of sub-component lenses permanently or temporarily affixed in position to one another. The integrated illuminator-lens 500 in some embodiments is constructed of glass, plastic, and/or another material that is transparent, mostly transparent, and/or the like.

As illustrated, the integrated illuminator-aimer lens 500 includes a near-field illuminator lens 506 and a far-field illuminator lens 504. The near-field illuminator lens 506 embodies a molded optical lens that receives near-field light from a near-field light source, and project a corresponding near-field illumination that illuminates a corresponding field of view. The near-field illuminator lens 506 may be designed in a manner that produces the near-field illumination of a particular pattern, length, width, and/or the like, at a particular intensity defined at least in part by the near-field light source. Similarly the far-field illuminator lens 504 embodies a molded optical lens that receives far-field light from a far-field light source, and project a corresponding far-field illumination that illuminates a corresponding field of view. In some embodiments, each lens includes an input face that faces a corresponding light source and receives the light produced from the light source. Additionally or alternatively, in some embodiments, each lens includes an output face that faces the field of view into which the corresponding illumination is projected.

As depicted, the integrated illuminator-aimer lens 500 includes an integrated off-axis aimer projection lens that is used for off-axis aimer illumination projection. The integrated off-axis aimer projection lens includes a light focusing lens 508 and an axis redirecting lens 502. The integrated off-axis aimer projection lens is positioned under the far-field illuminator lens 504, and vertically central near (e.g., as close to centered between the two lenses vertically) the far-field illuminator lens 504 and near-field illuminator lens 506. In this regard, the aimer illumination projected via the integrated off-axis aimer projection lens may be minimized in distance from the center of the fields of view associated with the near-field illumination and far-field illumination.

The light focusing lens 508 includes a lens face on the back of the integrated illuminator-aimer lens 500. The lens face embodies an input face aligned at the same angle as a corresponding aimer light source, such that aimer light produced via the aimer light is produced towards and shines through the input face. For example, as illustrated, the lens face may be angled upwards at a 15-degree angle in a circumstance where an aimer light, when positioned within an apparatus chassis, is angled downwards at a 15-degree angle. In some embodiments, the lens face includes or is embodied by an aspherical lens, and/or the aimer light may be positioned to produce the aimer light towards a center of the aspherical lens.

The axis redirecting lens 502 includes a lens face on the front of the integrated illuminator-aimer lens 500. The axis redirecting lens 502 may be positioned lower than the corresponding light focusing lens 508 on the other side to provide sufficient volume for optical elements of the axis redirecting lens 508 and/or light focusing lens 502 to focus and/or redirect light to be in alignment with a particular axis. The lens face embodies an output face aligned with a targeted axis along which an aimer illumination is to be projected. As depicted, the axis redirecting lens 502 extends outwards from a base portion of the integrated illuminator-aimer lens 500, for example that connects the near-field illuminator lens, far-field lens, and integrated illuminator-aimer lens 500 into a single molded piece. Additionally or alternatively, in some embodiments as depicted, the axis redirecting lens 502 includes an angled face to reduce reflection from incoming light from reflecting back into the aimer light source. It will be appreciated that in other embodiments, the axis redirecting lens 502 need not include an angled face.

In some embodiments, one or more sub-lenses of the integrated illuminator-aimer lens 500 is designed based on one or more characteristics of a corresponding intended aimer light source. For example, in some embodiments, the light focusing lens 508 is designed with a particular curvature and/or conic constant based on the wavelength of aimer light produced by a desired aimer light source. For example, a light focusing lens 508 designed for green light may be different than a light focusing lens 508 designed for red light or yellow light. In one example embodiment, the light focusing lens 508 includes a y-radius of 2.3 and a conic constant (k) of −2.7910.

Additionally or alternatively, in some embodiments, the axis redirecting lens 502 is designed based on the one or more characteristics of a corresponding intended aimer light source. For example, in some embodiments, the axis redirecting lens 502 is designed based on an x, y, and/or z position value, and/or an x-offset (I), Y-offset (J), and/or Z-offset (K). Alternatively or additionally still, in some embodiments, the axis redirecting lens 502 is designed based on an alpha, beta, and/or gamma value. In one example embodiment, the off axis-projection lens 502 is designed based on an alpha value of −12.00, with all remaining parameters set to 0. Further still, in some embodiments, a front surface of the axis redirecting lens 502 is designed based on the corresponding aimer light source. For example, in some embodiments the front surface embodying an output face is tilted at a particular angle based on the characteristics of the aimer light produced by a particular aimer light source. In one example embodiment, the output face is tilted at a 16.63 degree angle to refract aimer light of a particular configuration (e.g., green aimer light). It will be appreciated that a particular lens may be designed based on a combination of requirements for multiple aimer light source(s) (e.g., to enable use with a green light or a red light via the same lens). Additionally or alternatively, in some embodiments, different parameters of different optical sub-components may be configured to design a particular aimer sub-portion of an integrated illuminator-aimer lens 500.

FIG. 6A illustrates an example assembly of an off-axis illuminator before assembly in accordance with at least one example embodiment of the present disclosure. Specifically, FIG. 6A depicts the integrated illuminator-aimer lens 500 together with supporting circuitry and related light sources for assembly. FIG. 6B illustrates an example assembly of an off-axis illuminator as assembled in accordance with at least one example embodiment of the present disclosure. In this regard, FIG. 6B depicts the components of FIG. 6A as assembled, such that the integrated illuminator-aimer lens 500 is fixedly attached the supporting circuitry at a position where the sub-lenses are properly positioned and oriented with respect to the corresponding light sources to form each of the illuminators. For example, the integrated illuminator-aimer lens 500 may be secured to the front of the supporting circuitry 508, as illustrated, to transition from the un-assembled components depicted in FIG. 6A to the assembled components depicted in FIG. 6B.

As illustrated, the off-axis illuminator assembly includes supporting circuitry 608 that embodies a flexible printed circuit board. The flexible printed circuit board includes multiple layers, which may be rigid or flexible as well, with connective circuitry between such layers that enables transmission of signals to and/or from components communicatively coupled at each layer. As illustrated, the front layer of the supporting circuitry 608 includes a near-field light source 604 and a far-field light source 606. It will be appreciated that the far-field light source 606 and near-field light source 604 may be soldered, pinned, or otherwise fixedly connected to the supporting circuitry 608 in a manner that communicatively couples such components with the supporting circuitry 608.

Each of the individual light sources are aligned with a particular sub-lens of the integrated illuminator-aimer lens 500. For example, in some embodiments the near-field light source 604 is positioned behind and aligned with the near-field illuminator lens 506 as depicted and described herein to enable projection of a near-field illumination from near-field light produced by the near-field light source 604. In this regard, the near-field light source 604 shines light through the near-field illuminator lens 506 to produce a specific near-field illumination based on the design of the near-field illuminator lens 506.

Similarly, in some embodiments the far-field light source 606 is positioned behind and aligned with the far-field illuminator lens 504 as depicted and described herein to enable projection of a far-field illumination from far-field light produced by the far-field light source 606. In this regard, the far-field light source 606 shines light through the far-field illuminator lens 504 to produce a specific far-field illumination based on the design of the far-field illuminator lens 504.

The supporting circuitry 608 further includes a second layer, which is positioned behind the first layer including the far-field light source 606 and the near-field light source 604. The second layer of the supporting circuitry 608 is communicatively coupled with an aimer light source 602. It will be appreciated that the aimer light source 602 may be soldered, pinned, or otherwise fixedly connected to the supporting circuitry 608 in a manner that communicatively couples the aimer light source 602 with the supporting circuitry 608.

In some embodiments, the aimer light source 602 is larger (and may be significantly larger, such as by an order of magnitude or more) than either or both of the near-field light source 604 and/or the far-field light source 606. Such size difference may exist for any of a myriad of reasons. In some contexts, the aimer light source 602 embodies a light source that produces light of a particular color (e.g., green or red, or any other color) whereas the far-field light source 606 and/or the near-field light source 604 may embody a light source that produces white light. In this regard, the color light may require electrical components of a larger size, more electrical components, optical components within the aimer light source 602, and/or the like. Alternatively or additionally, in some embodiments the aimer light 602 is of a greater power level than the power level than the near-field light source 604 and/or the far-field light source 606, where such an increased power level requires larger electrical components. It will be appreciated that, regardless of such reasons, the aimer light source 602 may ideally be positioned in a manner that enables projection of the aimer illumination pattern as centrally to the one or more capturable fields of view while simultaneously enabling the other light sources to produce illuminations intended to illuminate the capturable light sources with different intensities of light, for example to enable imaging.

In some embodiments, the first layer includes a cutout between the far-field light source 606 and the near-field light source 604. The cutout portion may be positioned in front of the aimer light source 602 to prevent any circuitry from blocking the aimer light produced via the aimer light source 602. In this regard, the cutout portion allows the aimer light source 602 to be positioned in a manner that aligns the produced light relatively centrally to the near-field light source 604 and the far-field light source 606.

As described herein, the aimer light source 602 similarly is angled downwards. In this regard, the aimer light source 602 may be angled downwards such that it is aligned with a particular sub-lens of the integrated illuminator-aimer lens 500, such as the light focusing lens 508 embodied as an input face on the back of the integrated off-axis aimer projection lens 500. In this regard, the aimer light source 602 produces aimer light that shines through and manipulated via the light focusing lens 508 and axis redirecting lens 502 to be projected as a particular desired aimer illumination. The aimer illumination may be configured based on the particular design of the light focusing lens 508 and/or axis redirecting lens 502, for example to produce a particular intensity level, pattern, and/or the like.

FIG. 7 illustrates an exploded view of an example off-axis aimer apparatus in accordance with at least one example embodiment of the present disclosure. Specifically, FIG. 7 illustrates an exploded view of a particular off-axis aimer apparatus 700 embodying a multi-imager and multi-illuminator off-axis aimer. In this regard, the off-axis aimer apparatus 700 is configured to produce two different field illuminations, capture two different fields of view, and generate an aimer illumination within said fields of view via an off-axis aimer illuminator arrangement as described herein. It will be appreciated that the off-axis aimer apparatus 700 may include imaging and/or illuminator components that are each oriented in alignment with a particular forward-facing directional axis, for example defining the direction of a center for the capturable fields of view and/or produced illuminations.

As illustrated, the off-axis aimer apparatus 700 includes an integrated illuminator-aimer lens 702. In some embodiments, the integrated illuminator-aimer lens 702 is embodied by the integrated illuminator-aimer lens 500 as depicted and described herein. Alternatively, in some embodiments, the integrated illuminator-aimer lens 702 is embodied having a light focusing lens including an input face aligned with an aimer light source at a different angle than the integrated illuminator-aimer lens 500. Alternatively or additionally still, in some embodiments, the off-axis aimer apparatus 700 instead includes a plurality of individual lenses not integrated into a single piece. For example, the off-axis aimer apparatus 700 may include a separate near-field illuminator lens, far-field illuminator lens, and integrated off-axis aimer projection lens. Additionally or alternatively still, in some embodiments, the off-axis aimer apparatus 700 includes a separate light focusing lens and axis redirecting lens rather than an integrated off-axis aimer projection lens.

The off-axis aimer apparatus 700 includes the integrated illuminator-aimer lens 702 that is positioned between a near-field lens 704A and a far-field lens 704B. The near-field lens 704A includes one or more optical component(s) that define a capturable near field of view. Similarly, the far-field lens 704B includes one or more optical component(s) that define a capturable far field of view. In some embodiments, the near-field lens 704A and far-field lens 704B each include one or more optical lenses that are defined at different focal lengths. In this regard, the focal length of the far-field lens 704B may be associated with a focal length that is greater than the focal length associated with the near-field lens. In some such embodiments, the far-field lens 704B further defines a narrower field of view than the near-field lens 704A, for example with greater clarity within that field of view at a greater distance in accordance with the greater focal length.

The off-axis aimer apparatus 700 further includes an assembly of illuminator and imagery hardware. Specifically, the off-axis aimer apparatus 700 includes supporting circuitry 710 communicative couplable to a near-field image sensor 712A, a far-field image sensor 712B, a near-field light source 714A, a far-field light source 714B, and/or an aimer light source 708. In this regard, the supporting circuitry 710 embodies a printed circuit board, integrated circuitry, and/or other wiring that enables transmission of electrical and/or data signals to and/or from the components communicatively coupled therewith. For example, in some embodiments, the supporting circuitry 710 is communicatively coupled with the near-field light source 714A, far-field light source 714B, and/or aimer light source 708 to enable signal(s) to be transmitted to such components that trigger activation and/or deactivation of the component(s) individually, for example to enable any such component to begin producing light and/or stop any such component from producing light. Additionally or alternatively, in some embodiments for example the supporting circuitry 710 is communicatively coupled with the far-field image sensor 712B and the near-field image sensor 712A to enable signal(s) to be transmitted to such components that trigger activation and/or deactivation of the component(s) individually, and/or output of corresponding data from such component(s). For example, in some embodiments, either of the image sensors may be activated to trigger the image sensor to capture data embodying a representation of an environment, and the resulting image data object captured via the image sensor is output from the sensor via the supporting circuitry 710 for transmission to and/or processing via another component (e.g., a processor communicatively coupled via the supporting circuitry 710).

The near-field image sensor 712A and the far-field image sensor 712B each embodies an electrical component configured for capturing images from light impacting such electrical components (e.g., light incident on the image sensor). Non-limiting examples of such image sensor(s) include a CMOS sensor and/or a CCD sensor. In some embodiments, the near-field image sensor 712A is associated with a different resolution than the far-field image sensor 712B. Alternatively, in some embodiments, the far-field image sensor 712B and the near-field image sensor 712A are configured in accordance with the same resolution.

The off-axis aimer apparatus 700 further includes a component holder 706. The component holder 706 includes defined cavities that position and align various components of the off-axis aimer apparatus 700. For example, as illustrated, the component holder 706 includes cavities for receiving the near-field lens 704A, the far-field lens 704B, and the integrated illuminator-aimer lens 702. In some embodiments, the component holder 706 includes one or more snaps, grooves, arms, or other physical components that secure the components into a particular position and/or alignment, for example to prevent movement and/or rotation of such components separate from movement and/or rotation of other corresponding components of the off-axis aimer apparatus 700. In some embodiments, the component holder 706 embodies an apparatus chassis with respect to the remaining components therein. In some embodiments, the various components are affixed, attached, or otherwise secured to the component holder 706 utilizing any of a myriad of securing mechanism(s). For example, in some embodiments, such component(s) are affixed to the component holder 706 utilizing one or more fitting feature(s), slot(s), pin(s), hole(s), and/or the like. Additionally or alternatively, in some embodiments, such component(s) are affixed to the component holder 706 utilizing adhesive(s) and/or other chemical mechanism(s).

In some embodiments, when assembled for example, each of the supporting circuitry 710 and the components communicatively coupled therewith are positioned and aligned via the component holder 706 in alignment with the corresponding lenses similarly positioned and aligned via the component holder 706. For example, the far-field image sensor 712B affixed to the supporting circuitry 710 may be positioned within a cavity of the component holder 706 in alignment with the far-field lens 704B similarly positioned within a cavity of the component holder 706, thereby forming a far-field imager defining a particular capturable far field of view. Similarly, the near-field image sensor 712B affixed to the supporting circuitry 710 may be positioned within a cavity of the component holder 706 in alignment with the near-field lens 704A similarly positioned within a cavity of the component holder 706, thereby forming a near-field imager defining a particular capturable near field of view. The near field of view may be broader than the far field of view, such that the far field of view represents a sub-view of the near field of view. In some embodiments, the far field imager captures clearer images when an object is further from the off-axis aimer apparatus 700, whereas the near field imager captures clearer images when an object is closer to the off-axis aimer apparatus 700, for example based on the different focal ranges associated with each imager.

Additionally or alternatively, in some embodiments, the near-field light source 714A is similarly positioned within a cavity of the component holder 706 in alignment with a particular sub-lens of the integrated illuminator-aimer lens 702, for example the corresponding near-field illumination lens thereof. Similarly, in some embodiments, the far-field light source 714B is similarly positioned within a cavity of the component holder 706 in alignment with another sub-lens of the integrated illuminator-aimer lens 702, for example the corresponding far-field illumination lens thereof. In this regard, such components define a far-field illuminator that generates a particular far field illumination, and a near-field illuminator that generates a particular near field illumination. The far field illumination may be more concentrated than the near field illuminator, enabling the far field illumination to better illuminate objects at a further distance corresponding to the further focal length of a corresponding far-field imager.

Additionally or alternatively still, in some embodiments, the aimer light source 708 affixed to the supporting circuitry 710 is similarly positioned within a cavity of the component holder 706 in alignment with a particular sub-lens of the integrated illuminator-aimer lens 702, for example at least an input face of a corresponding light focusing lens thereof. In this regard, the component holder 706 may define the cavity in a manner that secures the aimer light 708 at a particular angle (e.g., downwards at the particular angle) that differs from the forward-facing directional axis of the other components in the off-axis aimer apparatus 700. The light produced by the aimer light source 708 may shine uninterrupted until it reaches the sub-lens of the integrated illuminator-aimer lens 702, for example an input face of a light focusing lens, and subsequently be manipulated for focusing and/or redirection into alignment with the forward-facing directional axis.

It will be appreciated that by angling the aimer light source 708 downward, the vertical profile (e.g., embodying the height) of the off-axis aimer apparatus 700 may be reduced. For example, the aimer light 708 is associated with a particular diameter, thereby limiting the particular dimensions of the off-axis aimer apparatus 700. In a circumstance where the aimer light 708 were not angled, all dimensions of the off-axis aimer apparatus 700 would be limited to the diameter of the aimer light 708, particularly a height dimension that often is the smallest dimension. By angling the aimer light 708 downwards, however, the total height required is reduced as the angle increases. In this regard, angling the aimer light 708 further provides the advantage of enabling smaller form factor apparatuses, such that the off-axis aimer apparatus 700 may be utilized in mobile and/or other small form factor use cases. In one particular example context, the off-axis aimer apparatus 700 includes an apparatus height of under 6.8 millimeters, for example enabling the apparatus to be implemented along edges of small form factor mobile devices and/or the like. Additionally or alternatively, in some embodiments the apparatus 700 embodies an apparatus width of 23.5 millimeters and a depth of 16.2 millimeters.

Figure 8A:
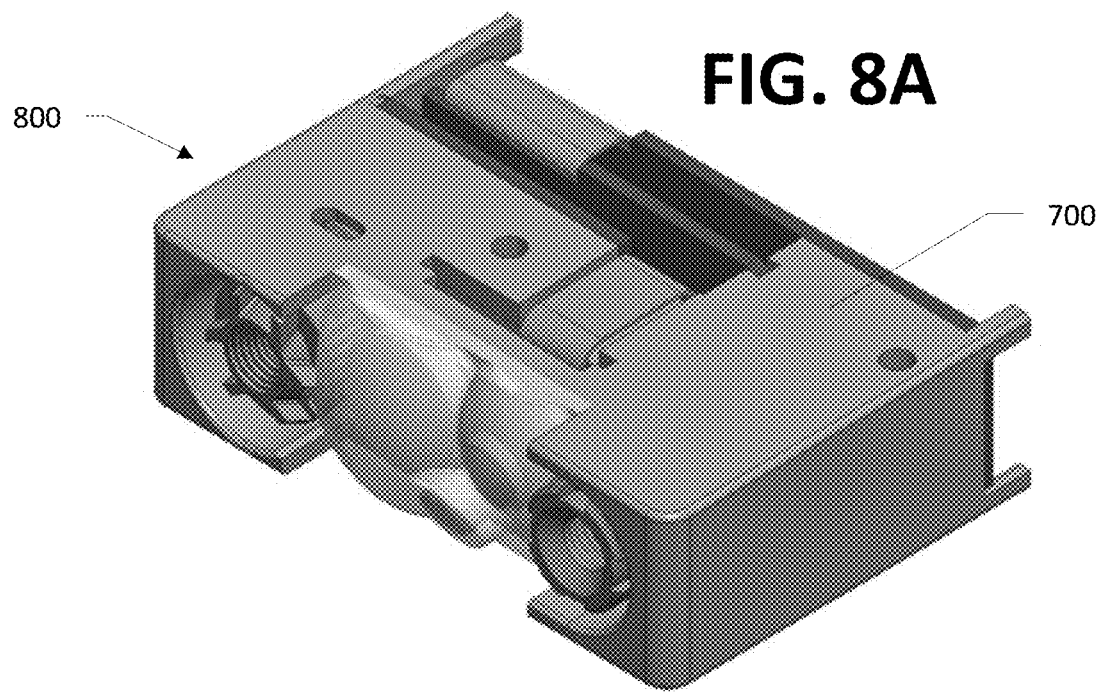
Figure 8B:
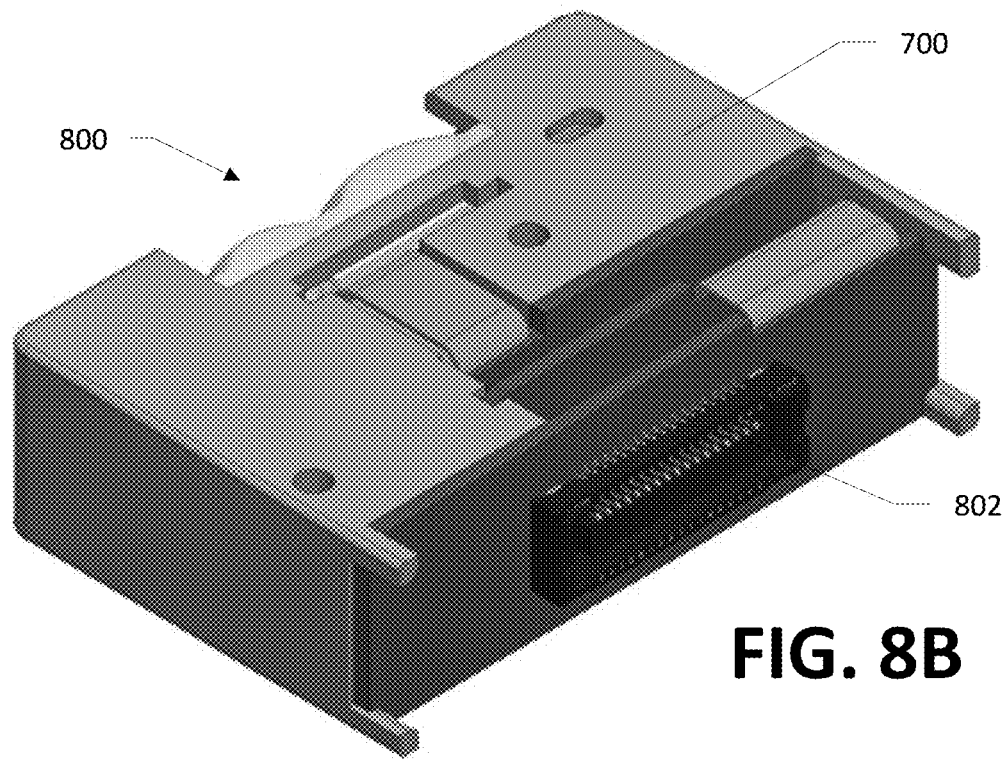
Figure 8C:
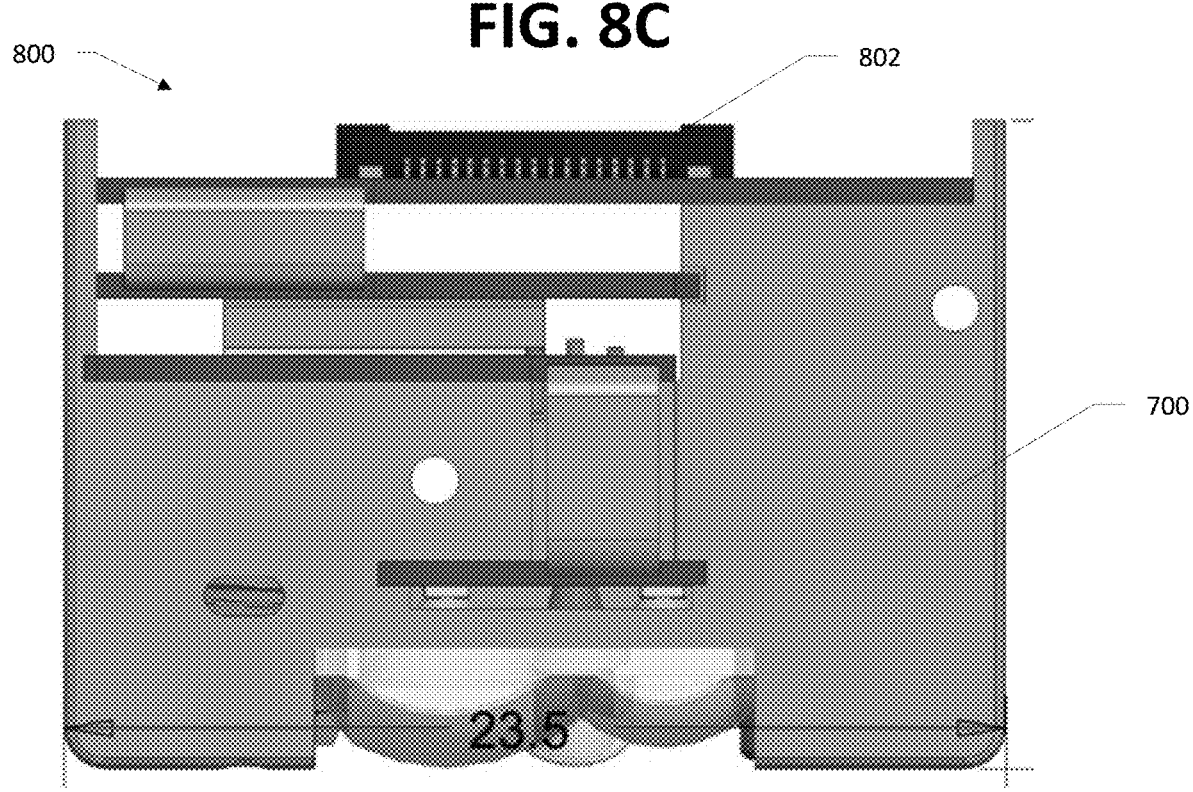
Figure 8D:
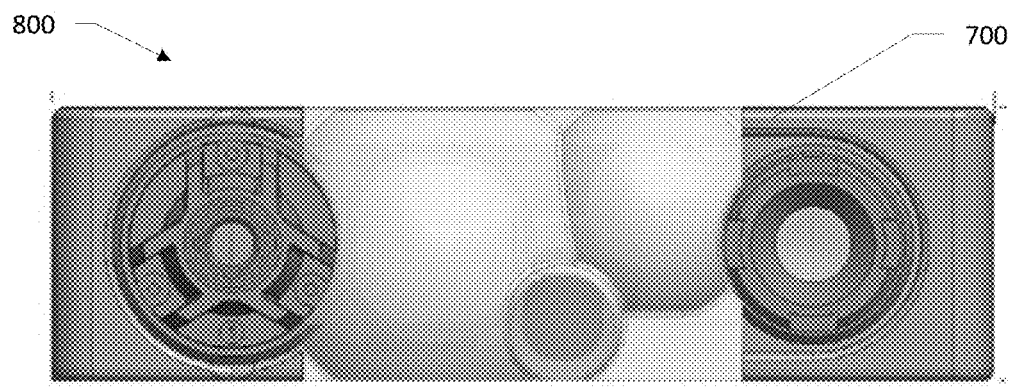

FIGS. 8A-8D each illustrate a different views of an assembled example off-axis aimer apparatus in accordance with at least one example embodiment of the present disclosure. Specifically, FIG. 8A depicts a front angled perspective view of the off-axis aimer apparatus 800 comprising the off-axis aimer apparatus 700 when fully assembled, FIG. 8B depicts a back angled perspective view of the off-axis aimer apparatus 800 comprising the off-axis aimer apparatus 700 when fully assembled, FIG. 8C depicts a top-down view of the off-axis aimer apparatus 800 comprising the off-axis aimer apparatus 700 when fully assembled, and FIG. 8D depicts a front orthographic view of the off-axis aimer apparatus 800 comprising the off-axis aimer apparatus 700 when fully assembled. As depicted, the components as depicted and described with respect to FIG. 7 are each positioned and aligned within the component holder.

Additionally, FIGS. 8A-8D depict example engine input/output circuitry 802. As illustrated, the engine input/output circuitry 802 embodies a multi-pinned interface that enables connection to the supporting circuitry of the off-axis aimer apparatus 800. In some embodiments, the engine input/output circuitry 802 enables the electrical and/or data signal transmission to and/or from the components of the off-axis aimer apparatus 800, and to and/or from an external processor, device, and/or the like. In some embodiments, for example, the engine input/output circuitry 802 is usable to connect the off-axis aimer apparatus 800 with at least one processor and/or memory of a scanning device, enabling the at least one processor and/or memory to transmit signal(s) that activate component(s) of the off-axis aimer apparatus 800 and/or transmit signal(s) that retrieve image data captured via the component(s) thereof. In some embodiments, the engine input/output circuitry 802 receives a cable of any known electrical wiring standard that connects the off-axis aimer apparatus 800 to such an external device and/or component(s). It should be appreciated that the engine input/output circuitry 802 in some embodiments enables the off-axis aimer apparatus 800 to be utilized modularly within different, larger apparatus chasses for use in different imaging use cases.

In some embodiments, the components of the off-axis aimer apparatus 800 are affixed within a particular apparatus chassis utilizing any of a myriad of manners and/or mechanisms. For example, in some embodiments, the components of the off-axis aimer apparatus 800 are affixed within an apparatus chassis utilizing one or more fitting mechanism(s), including and without limitation one or more slot(s), pin(s), hole(s), and/or the like. Additionally or alternatively, in some embodiments, the components of the off-axis aimer apparatus 800 are affixed within an apparatus chassis utilizing adhesive and/or other chemical mechanism(s).

FIGS. 9A-9C each illustrate a different view of an example aimer illumination projected by an example off-axis aimer apparatus in accordance with at least one example embodiment of the present disclosure. Specifically, FIGS. 9A-9C each illustrate projection of an example aimer illumination 902 in alignment with a forward-facing axis 950 via an off-axis aimer illuminator. FIGS. 9B and 9C illustrates such projection in a wireframed manner that depicts the manipulation of the light to project said aimer illumination.

In some embodiments, the forward-facing axis 950 is defined by the capturable fields of view. For example, in some embodiments, the off-axis aimer apparatus includes the near-field imager and the far-field imager, with the forward-facing axis 950 defined by a central point of the lens and image sensor of said imagers. In this regard, the central point may similarly define a central point of the fields of view capturable via the apparatus.

As illustrated, aimer light 906 is produced at a particular angle based on the angle of the corresponding aimer light source that produces said aimer light 906. In this regard, the aimer light 906 may be produced in alignment with the downward-facing axis 952. The downward-facing axis 952 may be defined based on the angle of the aimer light source. In some embodiments, the downward-facing axis 952 is aligned with the corresponding forward-facing axis 950 in one or more other dimensions.

The aimer light 906 is produced into a light focusing lens, for example of an integrated off-axis aimer projection lens. The aimer light 906 then enters the optical components of the light focusing lens and is manipulated via the light focusing lens and/or an associated axis redirecting lens. As depicted, the aimer light 906 that enters the integrated off-axis aimer projection lens ("intra-lens light 904") is manipulated by the optical components to focus and/or redirect the light. Specifically, in some embodiments, the intra-lens light 904 is first be focused and/or collimated via the light focusing lens. The resulting collimated or focused light is refracted, for example by an axis redirecting lens, to redirect the intra-lens light 904 from the downward-facing axis 952 to the forward-facing axis 950. The axis redirecting lens may include one or more prism(s) or other optical components that facilitates such refraction at a defined angle. Alternatively or additionally, in some embodiments the axis redirecting lens embodies a flat surface that functions as the prism. The axis redirecting lens may refract the intra-lens light 904 in a manner that avoids refraction in any dimension that is not already in alignment with the forward-facing axis 950.

Accordingly, as illustrated, the light resulting after redirection is projected as the aimer illumination 902. In some embodiments, further manipulation of the light is not necessary. Accordingly, the aimer illumination 902 is projected into the environment to be viewed by a user, for example a user utilizing the device for scanning of machine-readable code(s).

Example Aimer Pattern Properties of the Disclosure

Having described example components, apparatuses, and subassemblies of the disclosure, example properties of example aimer patterns in accordance with the present disclosure will now be discussed. Some of the aimer patterns as depicted and described in FIG. may be projected via the example apparatuses, components, and/or subassemblies discussed herein, for example using the off-axis aimer arrangements described herein. Additionally, some of the aimer patterns as depicted and described in FIG. 10 are projected via on-axis aimer arrangements for comparison with the off-axis aimer arrangement described herein.

FIG. 10 illustrates intensity levels of different aimer illuminations projected by on-axis aimers and different off-axis aimers in accordance with at least one example embodiment of the present disclosure. Specifically, FIG. 10 depicts a plurality of intensity level graphs for green off-axis aimer illuminations projected using an off-axis aimer illuminator arrangement—graphs 1002A, 1002B, 1002C, and 1002D—a plurality of intensity level graphs for red off-axis aimer illuminations projected using an off-axis aimer illuminator arrangement—graphs 1004A, 1004B, 1004C, and 1004D—and a plurality of intensity level graphs for red on-axis illumination projected using a conventional on-axis aimer illuminator arrangement—graphs 1006A, 1006B, 1006C, and 1006D. Each of the graphs depicted represents an intensity level of an aimer illumination at one of a plurality of distances, specifically 0.1 meter from a target, 1 meter from a target, 2.5 meters from a target, and 10 meters from a target. The graphs represent captured data from testing the different on-axis and off-axis illuminator arrangements with respective colors.

Each graph is associated with a particular intensity, for example having a unit of $mJ/mm^2$. For example, an intensity value of 4.2 represents 4.2 millijoule per square millimeter. Additionally or alternatively, in some embodiments, each graph is associated with a particular efficiency value, where the efficiency value represents a ratio of output power of the aimer illumination to source power of the aimer light produced via the aimer light source(s). For example, an efficiency value of 0.68 represents that 68% of the aimer light produced via the aimer light source(s) will be projected as an aimer illumination.

As illustrated, the graphs corresponding to the 0.1 meter distance from the target each indicate aimer illuminations having intensity levels that would appear bright to a human user. Specifically, graph 1002A corresponds to a green off-axis aimer illumination having a peak intensity of 4.2 and an efficiency of 0.68, together with an x-radius of 0.55 millimeters and a y-radius of 1.1 millimeters, and graph 1004A corresponds to a red off-axis aimer illumination having a peak intensity of 5.8 and an efficiency of 0.69, together with an x-radius of 0.4 millimeters and a y-radius of 1.0 millimeters. Comparatively, the graph 1006A corresponds to a red on-axis aimer illumination having a peak intensity of 5.4 and an efficiency of 0.53, together with an x-radius of 0.42 millimeters and a y-radius of 0.90 millimeters. In this regard, any of the arrangements create an aimer illumination of sufficient size, intensity, and efficiency to be practically implemented and visible to a human operator.

Further as illustrated, the graphs corresponding to the 1 meter distance from the target each indicate aimer illuminations having intensity levels that would appear bright to a human user. Specifically, graph 1002B corresponds to a green off-axis aimer illumination having a peak intensity of 5.8 and an efficiency of 0.68, together with an x-radius of 0.55 millimeters and a y-radius of 0.66 millimeters. Similarly, graph 1004B corresponds to a red off-axis aimer illumination having a peak intensity of 7.7 and an efficiency of 0.69, together with an x-radius of millimeters and a y-radius of 0.44 millimeters. Further still, graph 1004C corresponds to a red on-axis aimer illumination having a peak intensity of 6.4 and an efficiency of 0.53, together with an x-radius of 0.43 millimeters and a y-radius of 0.6 millimeters. In this regard, even at the 1 meter distance, all such arrangements would create an aimer illumination of sufficient size, intensity, and efficiency to be practically implemented and visible to a human operator.

Using conventional on-axis aimer illuminator arrangements, significant drop off in intensity of an aimer illumination occurs between the distance changes from 1 meter to 2.5 meters to the target. Specifically, graph 1006C corresponds to a red on-axis aimer illumination having a peak intensity of 1.1 and an efficiency of 0.5, together with an x-radius of 1.4 millimeters and a y-radius of 1.0 millimeters. The intensity of this aimer illumination remains somewhat visible to a human operator, but likely will be difficult to see, especially under particular ambient lighting conditions (e.g., under direct sunlight). For example, light may become not visible under the 1 $mJ/mm^2$ threshold in direct sunlight ambient light. Comparatively, graph 1002C corresponds to a green off-axis aimer illumination having a peak intensity of 3.7 and an efficiency of 0.66, together with an x-radius of 0.83 millimeters and a y-radius of 0.65 millimeters. Similarly, graph 1004C corresponds to a red off-axis aimer illumination having a peak intensity of 2.2 and an efficiency of 0.67, together with an x-radius of 1.2 millimeters and a y-radius of 0.8 millimeters. In this regard, the intensities of the green and red off-axis aimer illuminations are significantly brighter (e.g., 2× or 3× in intensity), such that the aimer illuminations are well-defined and remain sufficiently visible to the user at these longer ranges.

Further significant drop off in intensity of an aimer illumination occurs between the distance changes from 2.5 meters and 10 meters to the target. Specifically, graph 1006D corresponds to a red on-axis aimer illumination having a peak intensity of 0.07 and an efficiency of 0.52, together with an x-radius of 5.7 millimeters and a y-radius of 4.1 millimeters. The intensity of this aimer illumination would likely be difficult if not impossible for most human operators to see. Comparatively, graph 1002D corresponds to a green off-axis aimer illumination having a peak intensity of 0.26 and an efficiency of 0.67, together with an x-radius of 4.3 millimeters and a y-radius of 3.2 millimeters. Similarly, graph 1004D corresponds to a red off-axis aimer illumination having a peak intensity of 0.13 and an efficiency of 0.68, together with an x-radius of 4.6 millimeters and a y-radius of 3.2 millimeters. In this regard, even at such significant distances, the intensities of the green and red off-axis aimer illuminations are significantly brighter (e.g., almost 4× as bright) than the corresponding on-axis aimer illumination.

In addition to the differences in brightness and efficiency, the different color aimer illuminations can be perceived differently by a human user. In this regard, the intensity differences may further be exacerbated with respect to a human operator's perception of the aimer illuminations in a circumstance where green light is utilized instead of red light. The green light may be significantly more perceptible to a human operator, such that a green off-axis aimer illuminator, for example, is ~7× more perceptible to a human operator than a corresponding red on-axis aimer illuminator. In this regard, in addition to the directly measurable improvements in brightness due to intensity, the color of the aimer light further enhances such improvements.

It will be appreciated that certain color light sources embody larger components. For example, green aimer light sources often are larger than red aimer light sources of the same intensity. Using the off-axis aimer arrangement described herein, however, such larger aimer light sources may nevertheless fit within small frame apparatus. In this regard, whereas conventional on-axis aimer arrangements may not be capable of fitting such colored aimer light sources (e.g., in implementations having a height of under 6.8 mm, or at or under 7 millimeters), the off-axis aimer arrangements described herein may fit such colored aimer light sources and provide improved visibility to a human operator simultaneously. In this regard, the off-axis aimer arrangements described herein enable small form factor imaging engines that are capable of fitting in smaller form factor apparatuses, for example having smaller height dimensions, than existing aimer arrangements.

Example Processes of the Disclosure

Having described example components, apparatuses, sub-assemblies, and properties of aimer illuminations of the disclosure, example flowcharts including various operations performed by the above described apparatus(es) will now be discussed. It should be appreciated that each of the flow-charts depicts an example processes that may be performed by one or more components of the above described apparatuses, for example any of the apparatuses depicted and/or described in FIGS. 1-9. The blocked operations of each process may be arranged in any of a number of ways, as depicted and described herein. In some embodiments one or more operations of a first process may occur in-between one or more operations, or otherwise operate as a sub-process, of a second process. Additionally or alternatively, the process may include some or all of the steps described and/or depicted, including one or more optional operations in some embodiments. In regards to the below described flowcharts, one or more of the depicted operations may be optional in some, or all, embodiments of the present disclosure. Optional operations are depicted with broken (or "dashed") lines. Similarly, it should be appreciated that one or more of the operations of each flowcharts may be combinable, replaceable, and/or otherwise altered as described herein.

FIG. 11 illustrates an example process 1100 for using an off-axis aimer arrangement, in accordance with at least one example embodiment of the present disclosure. In this regard, the example process 1100 may be performed by one or more specially configured apparatuses, such as the off-axis aimer imaging apparatus 200. In this regard, in some such embodiments, the off-axis aimer imaging apparatus 200 may be configured to perform one or more of the operations described herein utilizing one or more of the components therein, such as the processor 202, memory 204, and/or off-axis aimer imaging engine 100. In some such embodiments, the off-axis aimer imaging apparatus 200 is configured for performing one or more of the operations as depicted and described by executing computer program instructions stored therein, for example in the memory 204.

The process 1100 begins at operation 1102. At operation 1102, the process 1100 generates, via an aimer light source, aimer light oriented in alignment with a light focusing lens. The aimer light source is oriented along a first axis, for example where the aimer light source embodies an off-axis aimer light source angled at a particular angle with respect to a different second axis (e.g., a forward-facing axis). In some embodiments, a processor activates the aimer light source to generate the corresponding aimer light.

At operation 1104, the process 1100 projects, via the light focusing lens to an axis redirecting lens, focused light from the aimer light. In this regard, the light focusing lens includes an input face that receives the aimer light generated by the aimer light source, and similarly the axis redirecting lens includes an output face. In some embodiments, the light focusing lens and the axis redirecting lens are integrated or otherwise molded into a single piece, forming an integrated off-axis aimer projection lens. In this regard, light may be manipulated throughout optical components of the light focusing lens and the axis redirecting lens directly through the single piece. Alternatively or additionally, in some embodiments the light focusing lens and the axis redirecting lens are embodied by separate lenses, where an output face of the light focusing lens is aligned with an input face of the axis redirecting lens.

At operation 1106, the process 1100 projects, via an output face of the axis redirecting lens, an aimer illumination oriented along a second axis that differs from the first axis. In some embodiments, the second axis embodies a forward-facing axis associated with the off-axis aimer imaging apparatus 200. The output face may embody an angled face that refracts the focused light and outputs the aimer illumination in alignment with the second axis. In this regard, the output face of the axis redirecting lens may project the aimer illumination on-axis with the second axis. For example, the aimer illumination may be projected into one or more field(s) of view capturable by the off-axis aimer imaging apparatus 200.

Conclusion

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a light focusing lens comprising an input face and an output face;
   an axis redirecting lens having an angled front surface, wherein the axis redirecting lens is oriented along a second axis, wherein the axis redirecting lens is aligned with the output face of the light focusing lens; and
   an aimer light source aligned with the input face of the light focusing lens, wherein the aimer light source is configured to generate an aimer light, wherein the aimer light source is oriented along a first axis that is not parallel to the second axis and differs by a defined angle from the second axis, wherein the second axis is normal to a field of view capturable by one or more imagers,
   wherein the input face of the light focusing lens receives the aimer light, wherein the light focusing lens is configured to project a focused aimer light to the axis redirecting lens, and wherein the axis redirecting lens is configured to manipulate the focused aimer light, received along the first axis from the light focusing lens, to redirect the focused aimer light towards the second axis.

2. The apparatus according to claim 1, the apparatus further comprising:
   a near-field illuminator;
   a far-field illuminator; and
   the one or more imagers.

3. The apparatus according to claim 2, wherein the one or more imagers comprise a near-field imager oriented along the second axis, and wherein the one or more imagers comprise a far-field imager oriented along the second axis.

4. The apparatus according to claim 2, the apparatus comprising an integrated illuminator-aimer lens, the integrated illuminator-aimer lens comprising a near-field lens of the near-field illuminator, a far-field lens of the far-field illuminator, the light focusing lens, and the axis redirecting lens embodied molded together.

5. The apparatus according to claim 1, the apparatus comprising an integrated off-axis aimer projection lens, the integrated off-axis aimer projection lens comprising the light focusing lens and the axis redirecting lens.

6. The apparatus according to claim 1, the apparatus further comprising at least one imager oriented along the second axis.

7. The apparatus according to claim 1, the apparatus further comprising:
   at least one processor communicatively coupled with the aimer light source, wherein the at least one processor is configured to activate the aimer light source.

8. The apparatus according to claim 1, the apparatus further comprising:
   an apparatus chassis that houses and aligns each of the light focusing lens, the axis redirecting lens, and the aimer light source.

9. The apparatus according to claim 8, wherein the apparatus chassis is associated with a height of between 7 millimeters and 6.8 millimeters inclusive.

10. The apparatus according to claim 8, wherein the apparatus chassis is associated with a depth of 16.2 millimeters and a width of 23.5 millimeters.

11. The apparatus according to claim 1, wherein the aimer light source comprises at least one green laser diode.

12. The apparatus according to claim 1, wherein the aimer light source comprises at least one red laser diode.

13. The apparatus according to claim 1, wherein the light focusing lens comprises a collimating lens.

14. The apparatus according to claim 1, wherein the angled front surface is flat.

15. The apparatus according to claim 1, wherein the light focusing lens comprises an aspherical lens.

16. The apparatus according to claim 1, wherein the apparatus further comprises a chassis, wherein the chassis secures the light focusing lens, the axis redirecting lens, and the aimer light source in position.

17. The apparatus according to claim 1, wherein the aimer light source generates light of a light wavelength, and wherein at least one lens property of the light focusing lens is based at least in part on the light wavelength.

18. The apparatus according to claim 1, wherein the aimer light source generates light of a light wavelength, and wherein at least one lens property of the axis redirecting lens is based at least in part on the light wavelength.

19. A computer-implemented method comprising:
generating, via an aimer light source, an aimer light oriented in alignment with a light focusing lens, wherein the aimer light source is oriented along a first axis;
projecting, via the light focusing lens to an axis redirecting lens, a focused aimer light from the aimer light; and
manipulating, by the axis redirecting lens, the focused aimer light, received along the first axis from the light focusing lens, for redirecting an aimer illumination oriented along a second axis, wherein the second axis is not parallel to the first axis and differs by a defined angle from the first axis, and wherein the second axis is normal to a field of view capturable by one or more imagers.

20. A computer program product comprising at least one non-transitory computer-readable storage medium having computer program code stored thereon that, in execution with at least one processor, is configured for:
generating, via an aimer light source, an aimer light oriented in alignment with a light focusing lens, wherein the aimer light source is oriented along a first axis;
projecting, via the light focusing lens to an axis redirecting lens, a focused aimer light from the aimer light; and
manipulating, by the axis redirecting lens, the focused aimer light, received along the first axis from the light focusing lens, for redirecting an aimer illumination oriented along a second axis, wherein the second axis is not parallel to the first axis and differs by a defined angle from the first axis, and wherein the second axis is normal to a field of view capturable by one or more imagers.

* * * * *